(12) United States Patent
Shibayama et al.

(10) Patent No.: US 9,310,526 B2
(45) Date of Patent: *Apr. 12, 2016

(54) ANTI-REFLECTION FILM HAVING LAYERS WITH A BINDER MATRIX

(75) Inventors: Naoyuki Shibayama, Tokyo (JP); Toshiaki Yoshihara, Tokyo (JP)

(73) Assignee: TOPPAN PRINTING CO., LTD. (JP)

( * ) Notice: Subject to any disclaimer, the term of this patent is extended or adjusted under 35 U.S.C. 154(b) by 660 days.

This patent is subject to a terminal disclaimer.

(21) Appl. No.: 13/552,862

(22) Filed: Jul. 19, 2012

(65) Prior Publication Data

US 2012/0281287 A1 Nov. 8, 2012

Related U.S. Application Data

(63) Continuation of application No. PCT/JP2010/071834, filed on Dec. 6, 2010.

(30) Foreign Application Priority Data

Jan. 22, 2010 (JP) .................................. 2010-011906
Jan. 27, 2010 (JP) .................................. 2010-015324

(51) Int. Cl.
*G02B 1/10* (2015.01)
*G02B 1/111* (2015.01)
(Continued)

(52) U.S. Cl.
CPC ............ *G02B 1/111* (2013.01); *B29D 11/0073* (2013.01); *G02B 1/12* (2013.01);
(Continued)

(58) Field of Classification Search
CPC ...... B29D 11/0073; G02B 1/11; G02B 1/111; G02B 1/118; G02B 1/115; G02B 1/116; G02B 1/12; G02B 1/14; G02B 1/16; G02B 1/10; G02B 1/105; G02B 1/113; G02B 5/285; G02B 5/28; G02B 5/0294; G02F 1/133502; G02F 2202/022; G02F 2202/023; G02F 2202/16; G02F 2202/22; B29C 47/0038

USPC ......... 359/588, 585, 577, 580, 581, 582, 586, 359/589, 590, 601, 609; 428/323, 327, 428/411.1, 412, 423.1, 423.7, 424.2, 425.5, 428/425.6
See application file for complete search history.

(56) References Cited

U.S. PATENT DOCUMENTS

2005/0008863 A1* 1/2005 Mimura et al. ............... 428/409
2005/0053790 A1 3/2005 Kato
(Continued)

FOREIGN PATENT DOCUMENTS

CN 1790060 A 6/2006
CN 101285898 A 10/2008
(Continued)

OTHER PUBLICATIONS

Decision of Refusal issued by JPO for appl. No. JP 2013-507568, dispatched Feb. 4, 2014, with translation, 5 pgs.
(Continued)

*Primary Examiner* — Thong Nguyen
*Assistant Examiner* — Jyotsna Dabbi
(74) *Attorney, Agent, or Firm* — Squire Patton Boggs (US) LLP

(57) ABSTRACT

An anti-reflection film is provided having excellent optical property, excellent excoriation resistance, and antistatic function at low production costs. The anti-reflection film includes a localized layer and a low refractive index layer that are stacked in this order on at least one surface of a transparent substrate. The localized layer is stacked with an intermediate layer, a hard coat layer, an antistatic layer containing a conductive material, and a leveling layer containing a leveling material in this order, which are localized, at least from the side of the transparent substrate. The leveling material contains at least a fluorocompound or a compound which has a siloxane bond.

10 Claims, 2 Drawing Sheets

(51) Int. Cl.
  B29D 11/00 (2006.01)
  G02B 1/12 (2006.01)
  G02F 1/1335 (2006.01)
(52) U.S. Cl.
  CPC ..... *G02F1/133502* (2013.01); *G02F 2202/022* (2013.01); *G02F 2202/16* (2013.01); *G02F 2202/22* (2013.01)

(56) References Cited

U.S. PATENT DOCUMENTS

| | | | |
|---|---|---|---|
| 2006/0069192 A1* | 3/2006 | Nakamura et al. | 524/306 |
| 2006/0134400 A1 | 6/2006 | Takada et al. | |
| 2006/0221451 A1 | 10/2006 | Ohishi et al. | |
| 2007/0053055 A1* | 3/2007 | Mikami et al. | 359/359 |
| 2007/0172646 A1* | 7/2007 | Tanabe et al. | 428/328 |
| 2008/0013177 A1 | 1/2008 | Hatano et al. | |
| 2009/0075074 A1* | 3/2009 | Horio et al. | 428/341 |
| 2009/0141357 A1* | 6/2009 | Kamura et al. | 359/585 |
| 2009/0176084 A1* | 7/2009 | Yoshihara | G02B 1/111 428/313.3 |
| 2010/0304123 A1* | 12/2010 | Yoneyama | B32B 17/10018 428/317.9 |

FOREIGN PATENT DOCUMENTS

| | | |
|---|---|---|
| JP | 11-092750 | 4/1999 |
| JP | 2001-059902 | 3/2001 |
| JP | 2001-316604 | 11/2001 |
| JP | 2005-144849 | 6/2005 |
| JP | 2005-199707 | 7/2005 |
| JP | 2005-202389 | 7/2005 |
| JP | 2006-159415 | 6/2006 |
| JP | 2007-121993 | 5/2007 |
| JP | 2007-332181 | 12/2007 |
| JP | 2008-033348 | 2/2008 |
| JP | 2008-239724 | 10/2008 |
| JP | 2008-241882 | 10/2008 |
| JP | 2008-250315 | 10/2008 |
| JP | 2008-299007 | 12/2008 |
| JP | 2009-211061 | 9/2009 |
| JP | 2009-262149 | 11/2009 |
| JP | 2010-217873 | 9/2010 |
| TW | 200844476 | 11/2008 |
| WO | WO2006/109419 A1 | 10/2006 |

OTHER PUBLICATIONS

Notice of Reasons of First Rejection issued by State Intellectual Property office of China for appl. No. CN 2010-80062067.8, dispatched Jan. 22, 2014, with translation, 13 pgs.

International Preliminary Report on Patentability for PCT/JP2010/071834, mailed Aug. 9, 2012, and translation of Written Opinion of the International Searching Authority, 6 pgs.

Opinion Brief of Examination from the Taiwan Intellectual Property Bureau for appl. 100102029, received Mar. 3, 2015, 8 pgs.

Translation of the Opinion Brief of Examination from the Taiwan Intellectual Property Bureau for appl. 100102029, received Mar. 3, 2015, 5 pgs.

* cited by examiner

ANTI-REFLECTION FILM HAVING LAYERS WITH A BINDER MATRIX

This application is a continuation of International Application No. PCT/JP2010/071834, filed Dec. 6, 2010, which is incorporated herein by reference in its entirety.

BACKGROUND OF THE INVENTION

1. Field of the Invention

The present invention relates to an anti-reflection film which is arranged for the purpose that external light is prevented from the reflection on the surface of a window, a display, and the like. Particularly, the present invention relates to an anti-reflection film which is arranged on the surface of a display such as a liquid crystal display (LCD), a CRT display, an organic electroluminescence display (ELD), a plasma display (PDP), a surface-conduction electron-emitter display (SED), and a field-emission display (FED).

Particularly, the present invention relates to an anti-reflection film which is arranged on the surface of a liquid crystal display (LCD). Further, the present invention relates to an anti-reflection film which is arranged on the surface of a transmission type liquid crystal display (LCD).

2. Description of the Related Art

In general, displays are used in the environment into which external light and the like enter regardless of whether displays are used in indoor or outdoor. The incident light such as the external light causes regular reflection on the display surface and the like so that the reflected image is mixed with the displayed image and the quality of display screen is reduced. Therefore, it is essential to provide a display surface and the like with an anti-reflection function, and further, improvements of the anti-reflection function as well as a complex of functions other than the anti-reflection function are being demanded.

In general, an anti-reflection function is obtained as a result of the formation of an anti-reflection layer with a multilayer structure which repeatedly has high refractive index layers and low refractive index layers that are made of a transparent material such as metal oxide on a transparent substrate. The anti-reflection layer composed of the multilayer structure can be formed by a dry film-forming method such as chemical vapor deposition (CVD) and physical vapor deposition (PVD).

In the case where an anti-reflection layer is formed by a dry film-forming method, while there is an advantage of finely controlling the thickness of a low refractive index layer and a high refractive index layer, there is a problem of low productivity since the film is formed in a vacuum, which is thus unsuitable for mass production. On the other hand, as a method of forming an anti-reflection layer, the production of anti-reflection film by a wet film-forming method with the use of a coating liquid in which a large area, continuous production, and cost reduction are possible, has been attracting attention.

In addition, in an anti-reflection film in which such anti-reflection layer is arranged on a transparent substrate, the surface is relatively flexible, therefore, in order to give hardness to the surface, a technique in which a hard coat layer that is obtained by curing of an acrylic-based material is arranged and an anti-reflection layer is formed on the hard coat layer is generally used. This hard coat layer is provided with a high level of surface hardness, luster, transparency, and excoriation resistance by the acrylic-based material.

In the case where an anti-reflection layer is formed by a wet film-forming method, the anti-reflection layer is produced with the application of at least a low refractive index layer on a hard coat layer that is obtained by curing of the ionizing radiation curable materials, and the wet film-forming method has a merit of inexpensive production in comparison with a dry film-forming method, and thus, anti-reflection layers produced by such a wet film-forming method are widely distributed in the market.

<Patent document 1>: JP-A-2005-202389.
<Patent document 2>: JP-A-2005-199707.
<Patent document 3>: JP-A-H11-92750.
<Patent document 4>: JP-A-2007-121993.
<Patent document 5>: JP-A-2005-144849.
<Patent document 6>: JP-A-2006-159415.
<Patent document 7>: JP-A-2007-332181.

With the arrangement of an anti-reflection film onto a display surface, by the anti-reflection function of the anti-reflection film, the reflection of external light can be suppressed to improve the contrast of the display in a bright place. Further, the transmittance can be improved at the same time, therefore, an image can be displayed brighter than usual. In addition, the anti-reflection film is also expected to have an energy-saving effect that can suppress the power consumption of the backlight, and the like.

As for an anti-reflection film, an anti-reflection film with low production costs is demanded. Further, an anti-reflection film having excellent anti-reflection performance or excellent optical properties free from interference irregularity is demanded. In addition, an anti-reflection film with high excoriation resistance is demanded since the anti-reflection film is arranged on a display surface. In addition, an anti-reflection film having antistatic function for the prevention of dust adhesion is demanded. In the present invention, the problem to be solved is to provide an anti-reflection film with low production costs, having excellent optical properties and excellent excoriation resistance and antistatic function.

SUMMARY OF THE INVENTION

A first aspect of the present invention is an anti-reflection film having a transparent substrate, a localized layer and a low refractive index layer, the localized layer and the low refractive index layer being stacked on the transparent substrate in this order, an intermediate layer, a hard coat layer, an antistatic layer and a leveling layer being stacked in this order in the localized layer on the transparent substrate, the antistatic layer containing a conductive material, the leveling layer containing a leveling material, and the leveling material containing a fluorocompound or a compound which has a siloxane bond.

A second aspect of the present invention is the anti-reflection film according to the first aspect of the present invention, wherein the anti-reflection film has a parallel light transmittance of 93% or more, a haze of 1.0% or less, a surface resistivity in the range of $1\times10^5 - 1\times10^{12} \Omega/\square$ on said low refractive index layer, and a pure water contact angle in the range of 80°-130° on a surface of said low refractive index layer.

A third aspect of the present invention is the anti-reflection film according to the first aspect of the present invention, wherein the fluorocompound is selected from a compound containing a perfluoroalkyl group, or a compound containing a fluorinated alkenyl group.

A fourth aspect of the present invention is the anti-reflection film according to the first aspect of the present invention, wherein the conductive material contained in the antistatic layer is selected from a quaternary ammonium salt material, a metal oxide particle, and a conductive polymer.

A fifth aspect of the present invention is the anti-reflection film according to the first aspect of the present invention, wherein the conductive material contained in the antistatic layer includes a quaternary ammonium salt material, the leveling material contained in the leveling layer includes a fluorocompound, a molecular weight of the quaternary ammonium salt material (Q) is 1,000-100,000, and a molecular weight of the fluorocompound (A) is 500-100,000. All molecular weights are in the units of grams/mol.

A sixth aspect of the present invention is the anti-reflection film according to the first aspect of the present invention, wherein the conductive material contained in the antistatic layer includes metal oxide particles, the leveling material contained in the leveling layer includes a fluorocompound, an average particle size of the metal oxide particle is 1-500 nm, and a molecular weight of the fluorocompound (A) is 500-100,000.

A seventh aspect of the present invention is the anti-reflection film according to the first aspect of the present invention, wherein the conductive material contained in the antistatic layer includes a conductive polymer, the leveling material contained in said leveling layer includes a fluorocompound, an average particle size of the conductive polymer is 1-1,000 nm, and a molecular weight of the fluorocompound (A) is 500-100,000.

An eighth aspect of the present invention is the anti-reflection film according to the first aspect of the present invention, wherein the conductive material contained in the antistatic layer includes a quaternary ammonium salt material, the leveling material contained in said leveling layer includes a compound which has a siloxane bond, a molecular weight of the quaternary ammonium salt material (Q) is 1,000-100,000, and a molecular weight of the compound which has a siloxane bond (B) is 500-100,000.

A ninth aspect of the present invention is the anti-reflection film according to the first aspect of the present invention, wherein the conductive material contained in the antistatic layer includes metal oxide particles, the leveling material contained in the leveling layer includes a compound which has a siloxane bond, an average particle size of the metal oxide particle is 1-500 nm, and a molecular weight of the compound which has a siloxane bond (B) is 500-100,000.

A tenth aspect of the present invention is the anti-reflection film according to the first aspect of the present invention, wherein the conductive material contained in the antistatic layer includes a conductive polymer, the leveling material contained in the leveling layer includes a compound which has a siloxane bond, an average particle size of the conductive polymer is preferably 1-1,000 nm, and a molecular weight of the compound which has a siloxane bond (B) is 500-100,000.

In the anti-reflection film and the method of producing the anti-reflection film of the present invention, an anti-reflection film with low production costs, having excellent optical properties, high excoriation resistance and antistatic performance, can be provided. Particularly, an anti-reflection film having excellent excoriation resistance can be provided.

DESCRIPTION OF REFERENCE NUMERALS AND SIGNS

Figure 1:
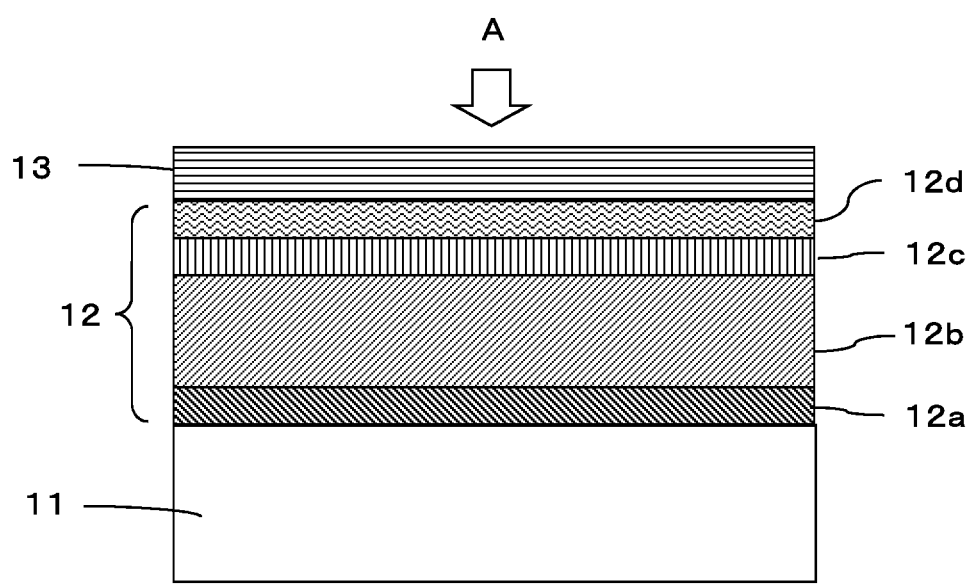
FIG. 1 is a schematic sectional view illustrating an anti-reflection film in one Example of the present invention.

1 Anti-reflection film
11 Transparent substrate
12 Localized layer
12a Intermediate layer
12b Hard coat layer
12c Antistatic layer
12d Leveling layer
13 Low refractive index layer
21 Coating unit
22 Drying unit
22a Primary drying unit
22a Secondary drying unit
23 Ionizing radiation irradiating unit
31 Unwinder
32 Rewinder Embodiment of the Invention An anti-reflection film of the present invention will be described. FIG. 1 is a schematic sectional view of the anti-reflection film (1) of the present invention.

The anti-reflection film (1) of the present invention is provided with a localized layer (12) and a low refractive index layer (13) in this order on at least one surface of a transparent substrate (11) from the side of the transparent substrate. The localized layer (12) contains an ionizing radiation curable material which is a binder matrix-forming material; a quaternary ammonium salt material, a metal oxide particle or a conductive polymer, which is a conductive material; and a leveling material. The ionizing radiation material and the like are cured with ionizing radiation to form a binder matrix, and can result in giving high hardness onto the surface of the anti-reflection film. Herein, the localized layer is formed of an intermediate layer (12a), a hard coat layer (12b), an antistatic layer (12c) in which the conductive material is localized, and a leveling layer (12d) in which the leveling material is localized, in this order from the side of the transparent substrate. Further, in the anti-reflection film of the present invention, the leveling material contains at least a fluorocompound or a compound which has a siloxane bond.

The intermediate layer (12a) is formed on the interface between the transparent substrate (11) and the localized layer (12). In the intermediate layer (12a), the component of the transparent substrate and the component of the ionizing radiation curable material of the localized layer are mixed. The intermediate layer (12a) has a value of refractive index changing gradually from the value of refractive index of the transparent substrate (11) to the value of refractive index of the hard coat layer (12b) in the thickness direction from the side of the transparent substrate (11) toward the side of the low refractive index layer (13).

With the arrangement of the intermediate layer (12a) which has a value of refractive index changing gradually from the value of refractive index of the transparent substrate (11) to the value of refractive index of the hard coat layer (12b), interference fringes that occur on the interface between the localized layer and the transparent substrate can be prevented. Further, the intermediate layer can improve the adhesion between the transparent substrate (11) and the localized layer (12). Meanwhile, the intermediate layer can be formed by containing a solvent that dissolves or swells the transparent substrate, in a coating liquid for forming a localized layer when the localized layer is formed.

The presence of intermediate layer (12a) can be confirmed by calculating the spectral reflectance at the incidence angle of 5° from the side of the low refractive index in the obtained anti-reflection film. In the case where an interference peak (multiple ripples are observed in the spectral waveform) corresponding to the thickness of the low refractive index layer is confirmed from the obtained spectral reflectance, it is determined that the intermediate layer (12a) is not formed, and irregularity of interference fringes is observed in an appearance inspection of the anti-reflection film, the back surface of the anti-reflection film being treated with black coating. On the other hand, in the case where an interference peak corresponding to the thickness of the low refractive index layer is not confirmed from the obtained spectral reflectance, it is determined that the intermediate layer (12a) is formed, and interference irregularity is not observed at all in an appearance inspection of the anti-reflection film, the back surface of the anti-reflection film being treated with black coating.

Further, the interference fringes and the interference irregularity are one kind of color irregularities due to the optical interference, are resulted mainly from the refractive index difference between the transparent substrate and the hard coat layer, and are a phenomenon where multiple optical interferences occur at the same time and rainbow-like color irregularity is observed in the case where the film thickness is thick. The color irregularity is a color irregularity of reflection resulted from irregularity of the film thickness of the low refractive index layer and a phenomenon where the variation in the color on the surface increases.

The hard coat layer (12b) contains an ionizing radiation curable material as a main component, and improves the surface hardness and gives the excoriation resistance in anti-reflection film. Whether the hard coat layer is formed or not can be determined from the pencil hardness of the surface of the localized layer.

Further, the antistatic layer (12c) localizes a conductive material, and gives antistatic performance to the anti-reflection film. When the conductive material is localized, the use amount of the conductive material can be reduced as compared with that when the conductive material is dispersed, therefore, the production costs can be reduced. In the antistatic layer, whether the antistatic layer is formed or not can be determined from the surface resistivity of the anti-reflection film.

Furthermore, the leveling layer (12d) is localized with a leveling material on the antistatic layer. The leveling layer improves the adhesion between the localized layer and the low refractive index layer, prevents the peeling of the low refractive index layer from the localized layer, and gives the excoriation resistance to the anti-reflection film.

Whether the leveling layer (12d) is formed in the localized layer (12) of the anti-reflection film of the present invention or not can be determined from the surface analysis by X-ray photoelectron spectroscopy (XPS).

In addition, the presence or absence of the antistatic layer (12c) under the leveling layer can also be determined from the depth direction analysis (depth profile) by an X-ray photoelectron spectroscopy (XPS).

XPS is an apparatus that analyzes the chemical state on the surface of a sample. When a sample is irradiated with X ray (energy: hv), inner shell electrons in an element are ejected by the photoelectric effect, and the kinetic energy (Ek) of a photoelectron at this time is represented by general formula (A) $Ek = hv - Eb - \phi$. Herein, Eb is the energy level (bound energy) of inner shell electron, and $\phi$ is the work function of the apparatus or the sample. Further, Eb is a specific value of an element, and changes depending on the chemical state of the element. On the other hand, the distance that the electron can pass through in solid while keeping the energy is tens of Å at most. XPS is an apparatus that can analyze a kind, an amount, and chemical state of an element that exists from on the surface to in the depth of tens of Å of a sample by measuring Ek and the number of photoelectrons emitted from the surface of a sample. In addition, XPS allows the depth direction analysis in combination with ion etching.

The low refractive index layer (13) arranged on the localized layer (12) gives anti-reflection function to the anti-reflection film. At this time, the film thickness (d) of the low refractive index layer (13) is designed so that the optical film thickness (nd) obtained by multiplying the film thickness (d) by the refractive index (n) of the low refractive index layer is equal to ¼ of the wavelength of visible light. The low refractive index layer (13) is formed by the application of a coating liquid that contains a low refractive index layer-forming material onto the localized layer.

When a conductive material is contained and localized in a localized layer-forming material to form the low refractive index layer on the surface of the localized layer, the adhesion between an antistatic layer in which the conductive material is localized and a low refractive index layer on the antistatic layer is poor, as a result, the excoriation resistance is reduced by the peeling of the low refractive index layer. The present inventors found that by the further addition of a leveling material into a coating liquid for forming a localized layer that contains an ionizing radiation curable material and a conductive material, a leveling layer is formed on an antistatic layer in which the conductive material is localized, the adhesion between the localized layer and the low refractive index layer is improved, and thus an anti-reflection film having high excoriation resistance can be provided. As a result, the present invention has been completed.

In the case where a conductive material is localized on the outermost surface of a localized layer, a low refractive index layer-forming material and a conductive material are electrically repulsive each other, and the adhesion force between the localized layer and the low refractive index layer is reduced, and thus the excoriation resistance of the anti-reflection film is reduced. Further, in the case where the electric repulsion between the low refraction layer-forming material and the conductive material is stronger, there may be a defect that the repelling and the like occur when the coating liquid for forming a low refractive index layer is applied. Furthermore, in the case where a water-repellent material is contained in the low refractive index layer-forming material, due to the electrical repulsion between the conductive material and the water-repellent material in the low refractive index layer material, the intended antifouling performance may not be obtained.

In addition, in the present invention, by the application of a coating liquid for forming a localized layer, an intermediate layer, a hard coat layer, an antistatic layer, and a leveling layer, which constitute a localized layer, can be formed at the same time. As a result, the production costs can be suppressed as compared with the case where a hard coat layer and an antistatic layer are sequentially applied/formed onto a transparent substrate.

In the localized layer (12), the conductive material easily precipitates on the surface of the localized layer (12) as compared with an ionizing radiation curable material which is a binder matrix-forming material, and the leveling material more easily precipitates on the surface as compared with the conductive material. As a result, by the control of the conditions, that is, the drying temperature and the time for the localization when the localized layer is formed, an intermediate layer, a hard coat layer, an antistatic layer, and a leveling layer can be separated, and the constitution of these layers is provided as the localized layer.

The intermediate layer (12a) is composed of a binder matrix component and a triacetyl cellulose component of the localized layer. The intermediate layer (12a) has a value of refractive index changing gradually from the value of refractive index of the transparent substrate (11) to the value of refractive index of the hard coat layer (12b) which is a value of refractive index of a binder matrix of the low refractive index layer, in the thickness direction from the side of the transparent substrate (11) toward the side of the low refractive index layer (13). By the arrangement of the intermediate layer (12a) which has a value of refractive index changing gradually from the value of refractive index of the transparent substrate (11) to the value of refractive index of the hard coat layer (12b), interference fringes that occur on the interface between the localized layer and the transparent substrate can be prevented. Further, the intermediate layer can improve the adhesion between the transparent substrate (11) and the localized layer (12).

The hard coat layer (12b) may contain an ionizing radiation curable material which is a binder matrix component, a conductive material and a leveling material. The hard coat layer (12b) is mainly constituted with the ionizing radiation curable material which is a binder matrix component, and the binder matrix component exists abundantly being localized, therefore, the hard coat layer (12b) can provide surface hardness to the anti-reflection film.

The antistatic layer (12c) may contain an ionizing radiation curable material which is a binder matrix component, a conductive material and a leveling material. The conductive material exists abundantly being localized, therefore, the antistatic layer (12c) expresses antistatic function, and thus can provide the antistatic function to the anti-reflection film.

The leveling layer (12d) may contain an ionizing radiation curable material which is a binder matrix component, and a leveling material. The leveling layer (12d) is mainly constituted with the leveling material, and contains no conductive material. In the case where the conductive material exists on the outermost surface of the localized layer, the adhesion force between the localized layer and the low refractive index layer is reduced when the low refractive index layer is formed on the localized layer, and thus the excoriation resistance of the anti-reflection film is reduced. In the anti-reflection film of the present invention, the leveling material has lower surface tension than that of the conductive material for the outermost surface, therefore, a layer that contains no conductive material can be easily formed.

In the anti-reflection film of the present invention, when the low refractive index layer is formed there is no influence of the conductive material. Accordingly, the decrease of the adhesion force between the localized layer and the low refractive index layer can be prevented, high surface hardness can be provided to the anti-reflection film, and thus the anti-reflection film having excellent excoriation resistance and excellent antifouling property can be provided.

In the anti-reflection film of the present invention, it is preferable that the parallel light transmittance of the anti-reflection film is 93% or more, the haze of the anti-reflection film is in the range of 1.0% or less, the surface resistivity on the surface of the low refractive index layer of the anti-reflection film is in the range of $1\times10^5$–$1\times10^{12}\Omega/\square$, and the pure water contact angle on the surface of the low refractive index layer of the anti-reflection film is in the range of 80°-130°.

In the case where the parallel light transmittance of the anti-reflection film is less than 93%, or in the case where the haze is more than 1.0%, the anti-reflection film may have no transparency, become cloudy (pale white), and have the display contrast decreased. Further, the parallel light transmittance is preferably as high as possible, and the haze is preferably as low as possible in the anti-reflection film of the present invention. In addition, the parallel light transmittance of the anti-reflection film is preferably in the range of 93%-98%. In consideration of the materials to be used currently, it is difficult to prepare an anti-reflection film having the parallel light transmittance of more than 98%. Further, the haze of the anti-reflection film is preferably in the range of 0.05%-0.5%. In consideration of the materials to be used currently, it is difficult to prepare an anti-reflection film having the haze of less than 0.05%.

Further, the surface resistivity is preferably in the range of $1\times10^5$–$1\times10^{12}\Omega/\square$. Further, in the case where an anti-reflection film having the surface resistivity of less than $1\times10^5\Omega/\square$ on the surface of the anti-reflection film is prepared, a quaternary ammonium salt material, a metal oxide particle or a conductive polymer, which is a conductive material are required in a large amount, and the localized layer of the present invention may not be formed. Furthermore, transparency (total light transmittance value) may be reduced. In the case where the surface resistivity on the surface of the anti-reflection film is $1\times10^{10}$–$1\times10\Omega/\square$, it is generally considered to be a region where dust does not adhere in the dynamic state, and this condition is required when the anti-reflection film is used on the outermost surface of a display. Therefore, the surface resistivity is determined to be preferably $1\times10^{12}\Omega/\square$ or less in the present invention.

Further, as for a method of measuring the surface resistivity, the surface resistivity can be measured in accordance with JIS-K6911 (1995).

In addition, in the anti-reflection film of the present invention, the pure water contact angle is preferably in the range of 80°-130°. By the setting of the pure water contact angle of 80° or more, an excellent antifouling property can be given to the low refractive index layer. Further, by the setting of the pure water contact angle in the range of 130° or less, the adhesion between the localized layer and the low refractive index layer improves when the low refractive index layer is formed, therefore, high surface hardness can be given, and thus, an anti-reflection film having excellent excoriation resistance and excellent antifouling property can be provided.

Furthermore, in the case where the pure water contact angle is more than 130°, there may be a risk that the repelling occurs when the low refractive index layer is formed, and the low refractive index layer cannot be formed. In addition, in the case where the pure water contact angle is less than 80°, a sufficient antifouling property may not be obtained.

Further, as for a method of measuring the pure water contact angle, the pure water contact angle may be measured in accordance with JIS R3257 (1999). Specifically, droplets are made at a needle tip in the dry state (20° C., 65% RH) with the use of a contact angle meter, and the droplets are brought into contact on the surface of a sample (solid) to make droplets, and with the measurement of the contact angle, the contact angle can be determined. The contact angle is an angle between the tangential line to the liquid surface and the solid surface at the contact point of the solid and the liquid, and is defined by an angular degree on the liquid-containing side. As the liquid, distilled water is used.

In addition, the anti-reflection film of the present invention is characterized in that the leveling material contained in the leveling layer includes at least a fluorocompound or a compound which has a siloxane bond. At this time, the fluorocompound is preferably selected from a compound containing a perfluoroalkyl group and a compound containing a fluorinated alkenyl group. Further, specific examples of the fluorocompound or the compound having a siloxane bond which is a leveling material will be described below.

Further, in the anti-reflection film of the present invention, the conductive material contained in the antistatic layer is preferably selected from a quaternary ammonium salt material, a metal oxide particle and a conductive polymer. Furthermore, specific examples of the conductive material selected from a quaternary ammonium salt material, a metal oxide particle and a conductive polymer will be described below.

In addition, in the anti-reflection film of the present invention, when the conductive material contained in the antistatic layer includes a quaternary ammonium salt material, and the leveling material contained in the leveling layer includes a fluorocompound, the molecular weight of the quaternary ammonium salt material (Q) is preferably 1,000-100,000, and the molecular weight of the fluorocompound (A) is preferably 500-100,000. By the setting of the molecular weight of the quaternary ammonium salt material (Q) and the molecular weight of the fluorocompound (A) in the predetermined ranges, a localized layer in which an intermediate layer, a hard coat layer, an antistatic layer and a leveling layer are localized and stacked in this order from the side of the transparent substrate can be formed.

In the case where the molecular weight of the quaternary ammonium salt material (Q) used in the localized layer is less than 1,000, the quaternary ammonium salt material becomes easily localized onto the surface of the localized layer, and the leveling layer is not formed, and the quaternary ammonium salt material exists on the surface of the localized layer. At this time, the low refractive index layer-forming material and the quaternary ammonium salt material are electrically repulsive each other, and the adhesion force between the localized layer and the low refractive index layer is reduced, and thus the excoriation resistance of the obtained anti-reflection film is reduced. On the other hand, in the case where the molecular weight of the quaternary ammonium salt material (Q) is more than 100,000, the quaternary ammonium salt material is localized and thus the antistatic layer cannot be formed. Further, in the case where the molecular weight of the fluorocompound (A) is more than 100,000, the conductive material and the leveling material are mixed each other to form a layer, and the antistatic layer and/or the leveling layer can not be formed.

Further, in the case where the molecular weight of the fluorocompound (A) which is a leveling material used for a localized layer is more than 100,000, the conductive material and the leveling material are mixed each other to form a layer, and the antistatic layer and/or the leveling layer is not formed, therefore, an anti-reflection film with sufficient antistatic property cannot be formed. Furthermore, the molecular weight of the fluorocompound (A) which is a leveling material is preferably 100,000 or less, but the molecular weight of the fluorocompound (A) is preferably 500-100,000 in consideration of commercially available leveling materials.

Further, in the anti-reflection film of the present invention, when the conductive material contained in the antistatic layer includes metal oxide particles, and the leveling material contained in the leveling layer includes a fluorocompound, the average particle size of the metal oxide particle is preferably 1-500 nm, and the molecular weight of the fluorocompound (A) is preferably 500 to 100,000. By the setting of the average particle size of the metal oxide particle and the molecular weight of the fluorocompound (A) in the predetermined ranges, a localized layer in which an intermediate layer, a hard coat layer, an antistatic layer and a leveling layer are localized and stacked in this order from the side of the transparent substrate can be formed.

In the case where the average particle size of the metal oxide particle is more than 500 nm, the metal oxide particle becomes easily localized onto the surface of the localized layer, and the metal oxide particle exists on the surface of the localized layer. At this time, the low refractive index layer-forming material and the metal oxide particle are electrically repulsive each other, and the adhesion force between the localized layer and the low refractive index layer is reduced, and thus the excoriation resistance of the obtained anti-reflection film is reduced. Further, in the anti-reflection film of the present invention, there is no problem with the average particle size of the metal oxide particle used as the conductive material being 500 nm or less, but the average particle size of the metal oxide particle is preferably 1-500 nm in consideration of the average particle size of commercially available metal oxide particles.

In addition, in the case where the molecular weight of the fluorocompound (A) which is a leveling material used for a localized layer is more than 100,000, the conductive material and the leveling material are mixed each other to form a layer, and the antistatic layer and/or the leveling layer is not formed, therefore, an anti-reflection film with sufficient antistatic property cannot be formed. Further, there is no problem with the molecular weight of the fluorocompound (A) which is a leveling material being 100,000 or less, but the molecular weight of the fluorocompound (A) is preferably 500-100,000 in consideration of the molecular weights of commercially available leveling materials.

In addition, in the anti-reflection film of the present invention, when the conductive material contained in the antistatic layer includes a conductive polymer, and the leveling material contained in the leveling layer includes a fluorocompound, the average particle size of the conductive polymer is preferably 1-1,000 nm, and the molecular weight of the fluorocompound (A) is preferably 500-100,000. By the setting of the average particle size of the conductive polymer and the molecular weight of the fluorocompound (A) in the predetermined ranges, a localized layer in which an intermediate layer, a hard coat layer, an antistatic layer and a leveling layer are localized and stacked in this order from the side of the transparent substrate can be formed.

In the case where the average particle size of the conductive polymer is more than 1,000 nm, the metal oxide particle becomes easily localized onto the surface of the localized layer, and the conductive polymer exists on the surface of the localized layer. At this time, the low refractive index layer-forming material and the conductive polymer are electrically repulsive each other, and the adhesion force between the localized layer and the low refractive index layer is reduced, and thus the excoriation resistance of the obtained anti-reflection film is reduced. Further, in the anti-reflection film of the present invention, there is no problem with the average particle size of the conductive polymer used as the conductive material being 1,000 nm or less, but the average particle size of the conductive polymer is preferably 1-1,000 nm in consideration of the average particle size of commercially available conductive polymers.

In addition, in the case where the molecular weight of the fluorocompound (A) which is a leveling material used for a localized layer is more than 100,000, the conductive material and the leveling material are mixed each other to form a layer, and the antistatic layer and/or the leveling layer is not formed, therefore, an anti-reflection film with sufficient antistatic property cannot be formed. Further, there is no problem with the molecular weight of the fluorocompound (A) which is a leveling material being 100,000 or less, but the molecular weight of the fluorocompound (A) is preferably 500 or more in consideration of commercially available leveling materials.

In addition, in the anti-reflection film of the present invention, when the conductive material contained in the antistatic layer includes a quaternary ammonium salt material, and the leveling material contained in the leveling layer includes a compound which has a siloxane bond, the molecular weight of the quaternary ammonium salt material (Q) is preferably 1,000-100,000, and the molecular weight of the compound which has a siloxane bond (B) is preferably 500-100,000. By the setting of the molecular weight of the quaternary ammonium salt material (Q) and the molecular weight of the fluorocompound (A) in the predetermined ranges, a localized layer in which an intermediate layer, a hard coat layer, an antistatic layer and a leveling layer are localized and stacked in this order from the side of the transparent substrate can be formed.

In the case where the molecular weight of the quaternary ammonium salt material (Q) used in the localized layer is less than 1,000, the quaternary ammonium salt material becomes easily localized onto the surface of the localized layer and the leveling layer is not formed, and the quaternary ammonium salt material exists on the surface of the localized layer. At this time, the low refractive index layer-forming material and the quaternary ammonium salt material are electrically repulsive each other, and the adhesion force between the localized layer and the low refractive index layer is reduced, and thus the excoriation resistance of the obtained anti-reflection film is reduced. On the other hand, in the case where the molecular weight of the quaternary ammonium salt material (Q) is more than 100,000, the quaternary ammonium salt material is localized and the antistatic layer cannot be formed. Further, in the case where the molecular weight of the compound which has a siloxane bond (B) is more than 100,000, the conductive material and the leveling material are mixed each other to form a layer, and the antistatic layer and/or the leveling layer cannot be formed.

In addition, in the case where the molecular weight of the compound having a siloxane bond (B) which is a leveling material used for a localized layer is more than 100,000, the conductive material and the leveling material are mixed each other to form a layer, and the antistatic layer and/or the leveling layer is not formed, therefore, an anti-reflection film with sufficient antistatic property cannot be formed. Further, there is no problem with the molecular weight of the compound having a siloxane bond which is a leveling material being 100,000 or less, but the molecular weight of the compound which has a siloxane bond (B) is preferably 500-100,000 in consideration of commercially available leveling materials.

In addition, in the anti-reflection film of the present invention, when the conductive material contained in the antistatic layer includes metal oxide particles, and the leveling material contained in the leveling layer includes a compound which has a siloxane bond, the average particle size of the metal oxide particle is preferably 1-500 nm, and the molecular weight of the compound which has a siloxane bond (B) is preferably 500-100,000. By the setting of the average particle size of the metal oxide particle and the molecular weight of the compound which has a siloxane bond (B) in the predetermined ranges, a localized layer in which an intermediate layer, a hard coat layer, an antistatic layer and a leveling layer are localized and stacked in this order from the side of the transparent substrate can be formed.

In the case where the average particle size of the metal oxide particle is more than 500 nm, the metal oxide particle becomes easily localized onto the surface of the localized layer, and the metal oxide particle exists on the surface of the localized layer. At this time, the low refractive index layer-forming material and the metal oxide particle are electrically repulsive each other, and the adhesion force between the localized layer and the low refractive index layer is reduced, and thus the excoriation resistance of the obtained anti-reflection film is reduced. Further, in the anti-reflection film of the present invention, there is no problem with the average particle size of the metal oxide particle used as the conductive material being 500 nm or less, but the average particle size of the metal oxide particle is preferably 1-500 nm in consideration of commercially available metal oxide particles.

In addition, in the case where the molecular weight of the fluorocompound (A) which is a leveling material used for a localized layer is more than 100,000, the conductive material and the leveling material are mixed each other to form a layer, and the antistatic layer and/or the leveling layer is not formed, therefore, an anti-reflection film with sufficient antistatic property cannot be formed. Further, there is no problem with the molecular weight of the compound having a siloxane bond (B) which is a leveling material being 100,000 or less, but the molecular weight of the fluorocompound (A) is preferably 500-100,000 in consideration of commercially available leveling materials.

In addition, in the anti-reflection film of the present invention, when the conductive material contained in the antistatic layer includes a conductive polymer, and the leveling material contained in the leveling layer includes a fluorocompound, it is preferable that the average particle size of the conductive polymer is 1-1,000 nm and the molecular weight of the compound which has a siloxane bond (B) is 500-100,000. By the setting of the average particle size of the conductive polymer and the molecular weight of the compound which has a siloxane bond (B) in the predetermined ranges, a localized layer in which an intermediate layer, a hard coat layer, an antistatic layer and a leveling layer are localized and stacked in this order from the side of the transparent substrate can be formed.

In the case where the average particle size of the conductive polymer is more than 1,000 nm, the metal oxide particle becomes easily localized onto the surface of the localized layer, and the metal oxide particle exists on the surface of the localized layer. At this time, the low refractive index layer-forming material and the quaternary ammonium salt material are electrically repulsive each other, and the adhesion force between the localized layer and the low refractive index layer is reduced, and thus the excoriation resistance of the obtained anti-reflection film is reduced. Further, there is no problem with the average particle size of the conductive polymer used as the conductive material being 1,000 nm or less, but the average particle size of the conductive polymer is preferably 1-1,000 nm in consideration of the average particle size of commercially available conductive polymers.

In addition, in the case where the molecular weight of the compound having a siloxane bond (B) which is a leveling material used for a localized layer is more than 100,000, the conductive material and the leveling material are mixed each other to form a layer, and the antistatic layer and/or the leveling layer is not formed, therefore, an anti-reflection film with sufficient antistatic property cannot be formed. Further, there is no problem with the molecular weight of the compound having a siloxane bond (B) which is a leveling material being 100,000 or less, but the molecular weight of the compound which has a siloxane bond (B) is preferably 500 or more in consideration of commercially available leveling materials.

Meanwhile, the "molecular weight" in the present invention refers to a molecular weight determined from the structural formula when the molecular weight is 1,000 or less, or a weight average molecular weight when the molecular weight is more than 1,000.

Further, in the present invention, the average particle size of the metal oxide particle and the average particle size of the conductive polymer are determined by a light scattering method.

In addition, in the anti-reflection film of the present invention, the optical film thickness of the low refractive index layer is preferably in the range of 80-200 nm. By the setting of the optical film thickness of the low refractive index layer in the range of 80-200 nm, the spectral reflectance curve determined from the side of the surface (A) of the anti-reflection film can be taken as a spectral reflectance curve having the minimal value in the vicinity of 500 nm, and thus an anti-reflection film excellent in anti-reflection can be provided.

The spectral reflectance curve shows a tendency that the ascending curve toward the short wavelength direction is steeper than the ascending curve toward the long wavelength direction based on the minimal value. At this time, the ascending curve that is steeper toward the short wavelength direction based on the minimal value of the spectral reflectance curve, is responsible for the color of the reflected light of the anti-reflection film to be formed, and is responsible for the occurrence of color irregularity when the irregularity of the film thickness of the localized layer is generated. In the present invention, by the setting of the minimal value of the spectral reflectance curve in the vicinity of 500 nm, the reflection hue can be small, and the occurrence of color irregularity due to the ascending curve that is steeper toward the short wavelength direction can be suppressed.

In addition, in the anti-reflection film of the present invention, the average luminous reflectance on the low refractive index layer-forming surface (surface (A)) of the anti-reflection film is preferably in the range of 0.5%-2.0%.

In the case where the average luminous reflectance at the low refractive index layer-forming surface (surface (A)) of the anti-reflection film is more than 2.5%, an anti-reflection film having sufficient anti-reflection performance cannot be provided. On the other hand, it is difficult to realize an anti-reflection film having the average luminous reflectance of 0.2% on the surface of the anti-reflection film by the optical interference of the localized layer. Thus, the average luminous reflectance on the surface of the localized layer is preferably in the range of 0.2%-2.0%.

Further, in the anti-reflection film of the present invention, in the case where a quaternary ammonium salt material is used as the conductive material in the localized layer, the content of the quaternary ammonium salt material which is a conductive material in the localized layer is preferably 0.5-25 wt %. In the case where the content of the quaternary ammonium salt material which is a conductive material in the localized layer is less than 0.5 wt %, sufficient antistatic performance may not be obtained. On the other hand, in the case where the content of the quaternary ammonium salt material which is a conductive material is more than 25 wt %, the leveling layer is not formed properly. In addition, the quaternary ammonium salt material which is a conductive material has no hard coating property, and thus the hardness and the excoriation resistance of the anti-reflection film may be reduced. Further, the cost becomes high.

Further, in the anti-reflection film of the present invention, in the case where a metal oxide particle is used as the conductive material in the localized layer, the content of the metal oxide particle which is a conductive material in the localized layer is preferably 0.5-25 wt %. In the case where the content of the metal oxide particle which is a conductive material in the localized layer is less than 0.5 wt %, sufficient antistatic performance may not be obtained. On the other hand, in the case where the content of the metal oxide particle which is a conductive material is more than 25 wt %, the leveling layer is not formed properly.

Further, in the anti-reflection film of the present invention, in the case where a conductive polymer is used as the conductive material in the localized layer, the content of the conductive polymer which is a conductive material in the localized layer is preferably 0.1-25 wt %. In the case where the content of the conductive polymer which is a conductive material in the localized layer is less than 0.1 wt %, sufficient antistatic performance may not be obtained. On the other hand, in the case where the content of the conductive polymer which is a conductive material is more than 25 wt %, the leveling layer is not formed properly. Furthermore, the conductive polymer which is a conductive material has no hard coating property, and thus the hardness and the excoriation resistance of the anti-reflection film may be reduced. In addition, the cost becomes high.

The content of the fluorocompound and the compound having a siloxane bond which are leveling materials in the localized layer is preferably in the range of 0.001-5.00 wt %. In the case where the content of the leveling materials in the localized layer is less than 0.001 wt %, the leveling layer cannot be formed, and the conductive material becomes present on the outermost surface of the localized layer, and thus the excoriation resistance is reduced, and further formation of the low refractive index layer may be inhibited. On the other hand, in the case where the content of the leveling materials is more than 5.00 wt %, the amide layer becomes thick, and the antistatic function may be reduced.

The method of producing the anti-reflection film of the present invention will be explained.

The method of producing the anti-reflection film of the present invention is a method of producing an anti-reflection film in which a localized layer and a low refractive index layer are stacked in this order on at least one surface of a transparent substrate, which is provided in this order with a coating process in which a coating liquid for forming a localized layer containing an ionizing radiation curable material, a conductive material, a leveling material and a solvent, is applied on at least one surface of the transparent substrate, to form a coating film of the localized layer; a drying process in which the coating film of the localized layer is subjected to primary drying and secondary drying; a film-curing process in which the coating film of the localized layer is irradiated with ionizing radiation, to form a localized layer; a coating process in which a coating liquid for forming a low refractive index layer containing the low refractive index layer-forming material and a solvent is applied, to form a coating film of the low refractive index layer; a drying process in which the coating film of the low refractive index layer is dried; and a film-curing process in which the low refractive index layer is formed, and which is characterized in that the localized layer is formed as a result of being localized and stacked with an intermediate layer, a hard coat layer, an antistatic layer and a leveling layer in this order.

In the present invention, by the arrangement of a drying process in which primary drying is performed for the coating film of the localized layer, and a drying process in which secondary drying is performed for the coating film of the localized layer after the drying process of the primary drying, an intermediate layer, a hard coat layer, an antistatic layer in which the conductive material is localized, and a leveling layer in which the leveling material is localized, can be localized in this order in the localized layer.

Figure 2:
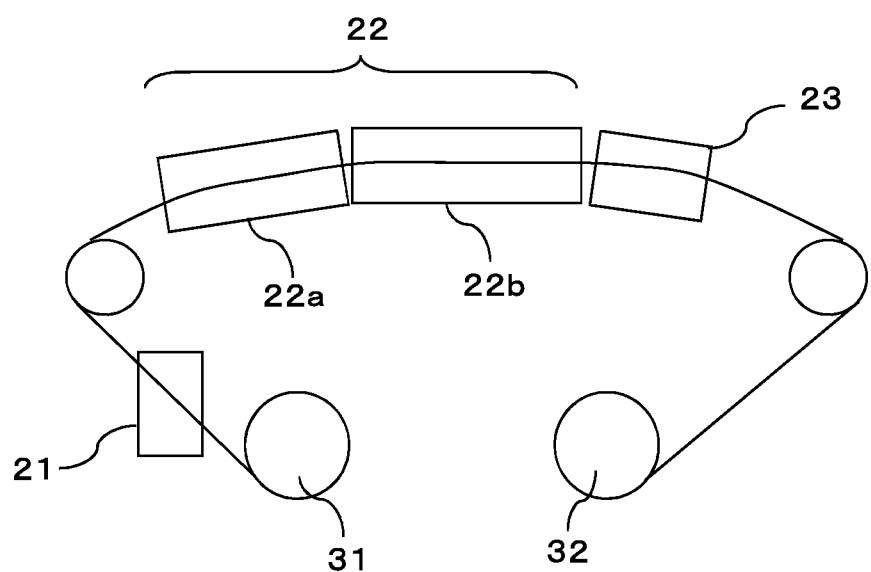
FIG. 2 is a schematic view illustrating a production process of an anti-reflection film in one Example of the present invention.

FIG. 2 illustrates a schematic view of one example of the apparatus for producing the anti-reflection film of the present invention.

In the apparatus for producing the anti-reflection film of the present invention, the apparatus is provided in this order with a coating process (21) in which a coating liquid for forming a localized layer including a binder matrix-forming material containing an ionizing radiation curable material, a conductive material, a leveling material, and a solvent is applied on a transparent substrate to form a coating film; two drying units (22) of a primary drying unit (22a) in which primary drying is performed and a secondary drying unit (22b) in which secondary drying is performed, for the coating film of the localized layer; and an ionizing radiation irradiating unit (23) in which irradiating the coating film of the localized layer with ionizing radiation to form the film-cured localized layer. The transparent substrate is continuously conveyed from an unwinder (31) to a rewinder (32), and thus the localized layer is formed on the transparent substrate.

Next, the coating process in which the coating liquid for forming a low refractive index layer is applied on the localized layer to form a coating film of the low refractive index layer, the drying process in which the coating film of the low refractive index layer is dried, and the film-curing process in which the low refractive index layer is formed, are performed to form the low refractive index layer. At this time, in the film-curing process in which the low refractive index layer is formed, in the case where an ionizing radiation curable material is used as the low refractive index layer-forming material, the ionizing radiation curable material is film-cured by irradiating with ionizing radiation to form the low refractive index layer. On the other hand, in the case where a heat curable material is used as the low refractive index layer-forming material, the heat curable material is film-cured by heating to form the low refractive index layer. In the formation of the low refractive index layer, the production apparatus shown in FIG. 2 may also be used to form the low refractive index layer on the localized layer, thereby to produce the anti-reflection film. In addition, the process of forming the localized layer and the process of forming the low refractive index layer, which have been described above, may also be continuously connected to produce the anti-reflection film.

In the method of producing the anti-reflection film of the present invention, 30 wt % or more of the total solvent contained in the coating liquid for forming a localized layer is a solvent that dissolves or swells the transparent substrate, and the solvent is preferably contained at the ratio of 25-85 wt % in the coating liquid for forming a localized layer. The solvent that dissolves or swells the transparent substrate in the range of 30 wt % or more of the total solvent contained in the coating liquid for forming a localized layer including a binder matrix-forming material, a conductive material, and a leveling material on the transparent substrate is used, and the solvent is contained at the ratio of 25-85 wt % in the coating liquid for forming a localized layer, as a result, a localized layer provided with a conductive material, an antistatic layer in which the leveling material is localized, and a leveling layer can be formed.

The solvent that dissolves or swells the transparent substrate contained in the coating liquid penetrates into the transparent substrate during the processes in which the coating liquid for forming a localized layer is applied on the transparent substrate to form the coating film and the resultant coating film is dried, and accordingly the binder matrix-forming material component also penetrates into the transparent substrate and is mixed with the substrate, thereby to form the intermediate layer. On the other hand, the conductive material and the leveling material hardly penetrate into the transparent substrate, and thus are segregated to the side of the antistatic layer and the leveling layer, which is the opposite side to the transparent substrate, thereby to form the localized layer.

With the use of the solvent that dissolves or swells the transparent substrate in the range of 30 wt % or more of the total solvent contained in the coating liquid for forming a localized layer, an intermediate layer composed of a transparent substrate component and a binder matrix component can be formed between the transparent substrate and the localized layer, and further the localized layer can be effectively formed. Meanwhile, in the case where the solvent that dissolves or swells the transparent substrate is less than 30 wt % of the total solvent, the localized layer may not be formed. The amount of the solvent in the coating liquid of the localized layer set in the range described above, the time until a quaternary ammonium salt material, a metal oxide particle or a conductive polymer, which is a conductive material in the coating film, and a leveling material, are localized to form the localized layer can be sufficiently obtained, and thus the localized layer can be easily produced.

Meanwhile, in the case where the amount of the solvent in the coating liquid for forming a localized layer is less than 25 wt %, there may be a risk that the coating film is rapidly dried, and thus the localized layer can not be formed. On the other hand, in the case where the amount of the solvent in the coating liquid for forming a localized layer is more than 85 wt %, the drying time is required to be prolonged and thus there may be a tendency that the mass production is unsuitable.

In the method of producing the anti-reflection film of the present invention, the drying process in which the coating film of the localized layer is dried, preferably includes two steps of continuous dryings, that is, a primary drying which is performed at the drying temperature in the range of 15-30° C. and a secondary drying which is performed at the drying temperature in the range of 40-150° C. In the drying process, the primary drying is preferably performed at the drying temperature in the range of 15-30° C. immediately after the application. By the setting of the primary drying temperature in the range of 15-30° C., the time until a quaternary ammonium salt material, a metal oxide particle or a conductive polymer, which is a conductive material in the coating film of the localized layer, and a leveling material are localized to form the localized layer can be sufficiently obtained.

Meanwhile, in the case where the drying temperature is higher than 30° C., there may be a risk that the coating film of the localized layer is rapidly dried, and thus the localized layer can not be formed. On the other hand, in the case where the drying temperature is lower than 15° C., the drying time is required to be prolonged and thus there may be a tendency that the continuous production is unsuitable.

In addition, the secondary drying is preferably performed at the drying temperature in the range of 50-150° C. By the setting of the secondary drying temperature in the range of 50-150° C., a localized layer in which an intermediate layer, a hard coat layer, an antistatic layer, and a leveling layer are localized and stacked in this order from the side of the transparent substrate can be formed. Further, in the case where the drying temperature is higher than 150° C., the evaporation rate of the solvent is extremely fast, and thus the surface of the localized layer becomes rough, therefore, there may be a risk that the haze occurs. On the other hand, in the case where the drying temperature is lower than 50° C., the solvent remains in the localized layer, and the localized layer becomes to have no hard coating property.

In addition, the drying may be insufficient with only the primary drying, therefore, appropriate heat drying may be performed at the drying temperature in the range of 50-150° C. also as the secondary drying after the primary drying. In the drying process, the primary drying and the secondary drying are performed at the drying temperatures described above, and thus the localized layer (12) can be easily produced.

In addition, in order to perform the isolation of each layer of the localized layer, the primary drying is performed. As the secondary drying, the heat drying is appropriately performed at the drying temperature in the range of 50-150° C., thereby to remove the solvent.

Further, in the method of producing the anti-reflection film of the present invention, during the drying process in which the coating film of the localized layer is dried, the time until the solvent contained in the coating film of the localized layer becomes 10 wt % or less is preferably in the range of 2-60 seconds.

By the setting that the time from the formation of the coating film of the localized layer on the transparent substrate until the solvent contained in the coating film which is composed of the coating liquid for forming a localized layer on the transparent substrate becomes 10 wt % or less in the range of 2-60 seconds, the time until the conductive material and the leveling material in the coating film are localized to form a localized layer can be sufficiently obtained, and as a result, the localized layer provided with an antistatic layer and an leveling layer can be easily formed.

In addition, in the case where the time until the solvent contained in the coating film of the localized layer becomes 10 wt % or less is less than 2 seconds, the coating film of the localized layer is rapidly dried, and thus the antistatic layer and the leveling layer may not be formed. Further, in the case where the time until the solvent contained in the coating film of the localized layer becomes 10 wt % or less is more than 60 seconds, it is extremely time-consuming, and thus this process is not practical. Even in the case where the localized layer is formed by a single sheet system, the cycle time becomes long, and the productivity is reduced, therefore, the process is not preferable.

The anti-reflection film of the present invention and the method of producing the anti-reflection film will be explained in more detail.

As the transparent substrate used in the anti-reflection film of the present invention, a film or a sheet composed of various organic polymers may be used. Examples of the transparent substrate include substrates ordinarily used in an optical member such as a display. In consideration of various physical properties, for example, optical properties such as transparency and light refractive index, and further impact resistance, heat resistance, durability, and the like, used are those composed of organic polymers, for example, polyolefins such as polyethylene and polypropylene; polyesters such as polyethylene terephthalate and polyethylene naphthalate; celluloses such as triacetyl cellulose, diacetyl cellulose, and cellophane; polyamides such as 6-nylon and 6,6-nylon; acryls such as polymethyl methacrylate; polystyrene; polyvinyl chloride; polyimide; polyvinyl alcohol; polycarbonate; and ethylene vinyl alcohol. Particularly, polyethylene terephthalate, triacetyl cellulose, polycarbonate, and polymethyl methacrylate are preferable. Among them, triacetyl cellulose has a small birefringence and good transparency, therefore, the triacetyl cellulose may be suitably used for a liquid crystal display.

Further, the thickness of the transparent substrate is preferably in the range of 25-200 µm, and more preferably in the range of 40-80 µm.

Furthermore, with the addition of known additives, for example, an ultraviolet absorbing agent, an infrared absorbing agent, a plasticizer, a lubricant, a colorant, an antioxidant, a fire-retardant, and the like into such organic polymers described above, those added with the functions from the additives can be used. In addition, as the transparent substrate, one kind selected from the organic polymers described above or a mixture of 2 or more kinds selected from the organic polymers, or those composed of the polymers may be used, or those stacked with multiple layers may be used.

Next, the localized layer will be explained.

When the localized layer is formed, an ionizing radiation curable material is contained as a binder matrix-forming material. As the ionizing radiation curable material, an acrylic-based material may be used. As the acrylic-based material, a monofunctional or polyfunctional (meth)acrylate compound such as acrylic acid with a polyhydric alcohol, or methacrylic acid ester; a polyfunctional urethane (meth)acrylate compound such as the one synthesized from hydroxyester of diisocyanate and polyhydric alcohol and acrylic acid or methacrylic acid, and the like may be used. Further, in addition to these, as the ionizing radiation type material, a polyether resin, a polyester resin, an epoxy resin, an alkyd resin, a spiroacetal resin, a polybutadiene resin, a polythiol polyene resin, and the like, which contain an acrylate-based functional group, may be used.

Further, "(meth)acrylate" in the present invention indicates both of "acrylate" and "methacrylate". For example, "urethane (meth)acrylate" indicates both of "urethane acrylate" and "urethane methacrylate".

Examples of the monofunctional (meth)acrylate compound include, for example, 2-hydroxyethyl (meth)acrylate, 2-hydroxypropyl (meth)acrylate, 2-hydroxybutyl (meth)acrylate, n-butyl (meth)acrylate, isobutyl (meth)acrylate, t-butyl (meth)acrylate, glycidyl (meth)acrylate, acryloyl morpholine, N-vinyl pyrrolidone, tetrahydrofurfuryl acrylate, cyclohexyl (meth)acrylate, 2-ethylhexyl (meth)acrylate, isobornyl (meth)acrylate, isodecyl (meth)acrylate, lauryl (meth)acrylate, tridecyl (meth)acrylate, cetyl (meth)acrylate, stearyl (meth)acrylate, benzyl (meth)acrylate, 2-ethoxyethyl (meth)acrylate, 3-methoxybutyl (meth)acrylate, ethylcarbitol (meth)acrylate, phosphoric acid (meth)acrylate, ethylene oxide-modified phosphoric acid (meth)acrylate, phenoxy (meth)acrylate, ethylene oxide-modified phenoxy (meth)acrylate, propylene oxide-modified phenoxy (meth)acrylate, nonyl phenol (meth)acrylate, ethylene oxide-modified nonyl phenol (meth)acrylate, propylene oxide-modified nonyl phenol (meth)acrylate, methoxy diethylene glycol (meth)acrylate, methoxy polythylene glycol (meth)acrylate, methoxypropylene glycol (meth)acrylate, 2-(meth)acryloyloxyethyl-2-hydroxypropylphthalate, 2-hydroxy-3-phenoxy propyl (meth)acrylate, 2-(meth)acryloyloxyethyl hydrogen phthalate, 2-(meth)acryloyloxypropyl hydrogen phthalate, 2-(meth)acryloyloxypropyl hexahydrohydrogen phthalate, 2-(meth)acryloyloxypropyl tetrahydrohydrogen phthalate, dimethylaminoethyl (meth)acrylate, trifluoroethyl (meth)acrylate, tetrafluoropropyl (meth)acrylate, hexafluoropropyl (meth)acrylate, octafluoropropyl (meth)acrylate, octafluoropropyl (meth)acrylate, and adamantane derivative mono(meth)acrylate such as adamantyl acrylate having monovalent mono(meth)acrylate derived from 2-adamantane and adamantanediol.

Examples of the di-functional (meth)acrylate compound include, for example, di(meth)acrylate such as ethylene glycol di(meth)acrylate, diethylene glycol di(meth)acrylate, butanediol di(meth)acrylate, hexanediol di(meth)acrylate, nonanediol di(meth)acrylate, ethoxylated hexanediol di(meth)acrylate, propoxylated hexanediol di(meth)acrylate, diethylene glycol di(meth)acrylate, polyethylene glycol di(meth)acrylate, tripropylene glycol di(meth)acrylate, polypropylene glycol di(meth)acrylate, neopentyl glycol di(meth)acrylate, ethoxylated neopentyl glycol di(meth) acrylate, tripropylene glycol di(meth)acrylate, and hydroxypivalic acid neopentyl glycol di(meth)acrylate.

Examples of the tri- or higher-functional (meth)acrylate compound include, for example, tri(meth)acrylate such as trimethylol propane tri(meth)acrylate, ethoxylated trimethylol propane tri(meth)acrylate, propoxylated trimethylol propane tri(meth)acrylate, tris 2-hydroxyethylisocyanurate tri (meth)acrylate, and glycerin tri(meth)acrylate; a tri-functional (meth)acrylate compound such as pentaerythritol tri(meth)acrylate, dipentaerythritol tri(meth)acrylate, and ditrimethylol propane tri(meth)acrylate; a tri- or higher-functional of polyfunctional (meth)acrylate compounds such as pentaerythritol tetra(meth)acrylate, ditrimethylol propane tetra(meth)acrylate, dipentaerythritol tetra(meth)acrylate, dipentaerythritol penta(meth)acrylate, ditrimethylol propane penta(meth)acrylate, dipentaerythritol hexa(meth)acrylate, and ditrimethylol propane hexa(meth)acrylate; and a poly-functional (meth)acrylate compound obtained by substituting part of these (meth)acrylates with an alkyl group or $\epsilon$-caprolactone.

As the acrylic-based materials, polyfunctional urethane acrylate may also be used. The urethane acrylate is obtained with the reaction of polyhydric alcohol, polyhydric isocyanate and acrylate containing a hydroxy group. Specifically, examples of the urethane acrylate include but are not limited to, UA-306H, UA-306T, UA-3061 and the like, which are manufactured by KYOEISHA CHEMICAL Co., LTD.; UV-1700B, UV-6300B, UV-7600B, UV-7605B, UV-7640B, UV-7650B, and the like, which are manufactured by The Nippon Synthetic Chemical Industry Co., Ltd.; U-4HA, U-6HA, UA-100H, U-6LPA, U-15HA, UA-32P, U-324A, and the like, which are manufactured by SHIN-NAKAMURA CHEMICAL CO., LTD.; Ebecryl-1290, Ebecryl-1290K, Ebecryl-5129, and the like, which are manufactured by DAICEL-UCB Company LTD.; and UN-3220HA, UN-3220HB, UN-3220HC, UN-3220HS, and the like, which are manufactured by Negami Chemical Industrial Co., Ltd.

Further, in addition to these, as the ionizing radiation type material, a polyether resin, a polyester resin, an epoxy resin, an alkyd resin, a spiroacetal resin, a polybutadiene resin, a polythiol polyene resin, and the like, which contain an acrylate-based functional group, may be used.

Further, the film thickness of the localized layer is preferably in the range of 3-20 µm in consideration of optical property, excoriation resistance, hardness and the like. Furthermore, the film thickness of the localized layer is more preferably in the range of 4-7 µm in consideration of the process and handling such as suppression of curling.

Into the coating liquid for forming a localized layer, a solvent is added. As the solvent, a solvent that dissolves or swells the transparent substrate is used in the range of 30 wt % or more of the total solvent.

Further, with the use of the solvent that dissolves or swells the transparent substrate in the range of 30 wt % or more of the total solvent contained in a coating liquid for forming a localized layer including a binder matrix-forming material and a quaternary ammonium salt material, and a leveling material on the transparent substrate, a localized layer in which the conductive material and the leveling material are localized can be formed.

With the use of the solvent that dissolves or swells the transparent substrate in the range of 30 wt % or more of the total solvent contained in the coating liquid for forming a localized layer, an intermediate layer composed of a transparent substrate component and a binder matrix component can be formed between the transparent substrate and the localized layer, and further the localized layer can be efficiently formed.

Meanwhile, in the case where the solvent that dissolves or swells the transparent substrate is less than 30 wt % of the total solvent, the localized layer may not be formed.

Examples of the solvent that dissolves or swells the transparent substrate in the case where triacetyl cellulose film is used as the transparent substrate, include ethers such as dibutyl ether, dimethoxymethane, dimethoxyethane, diethoxyethane, propylene oxide, dioxane, dioxolane, trioxane, tetrahydrofuran, anisole, and phenetol; or some ketones such as acetone, methyl ethyl ketone, diethyl ketone, dipropyl ketone, diisobutyl ketone, cyclopentanone, cyclohexanone, methyl cyclohexanone, and methyl cyclohexanone; or esters such as ethyl formate, propyl formate, n-pentyl formate, methyl acetate, ethyl acetate, methyl propionate, ethyl propionate, n-pentyl acetate, and γ-butyrolactone; and further, cellosolves such as methyl cellosolve, cellosolve, butyl cellosolve, and cellosolve acetic acid; and in addition, N-methyl-2-pyrrolidone, and dimethyl carbonate. These may be used alone in one kind or in combination of 2 or more kinds.

Examples of a solvent that does not dissolve or swell the triacetyl cellulose film include alcohols such as ethanol, isopropyl alcohol, aromatic hydrocarbons such as toluene, xylene, cyclohexane, and cyclohexyl benzene, hydrocarbons such as n-hexane, some ketones such as methyl isobutyl ketone, methyl butyl ketone, and diacetone alcohol. These may be used alone in one kind or in combination of 2 or more kinds.

In addition, the solvent is preferably contained at the ratio of 25-85 wt % in the coating liquid for forming a localized layer. By the setting of the amount of the solvent in the range described above in the coating liquid of the localized layer, the time until a quaternary ammonium salt material, a metal oxide particle, or a conductive polymer, which is a conductive material in the coating film, and the leveling material are localized to form a localized layer can be sufficiently obtained, and thus the localized layer can be easily produced.

Meanwhile, in the case where the amount of the solvent in the coating liquid for forming a localized layer is less than 25 wt %, there may be a risk that the coating film is rapidly dried, and thus the localized layer can not be formed. On the other hand, in the case where the amount of the solvent in the coating liquid for forming a localized layer is more than 85 wt %, the drying time is required to be prolonged and thus there may be a tendency that the mass production is unsuitable.

In addition, the process of drying the coating film of the localized layer is preferably performed under a solvent atmosphere with the solvent concentration of 0.2-10 vol %. The process of drying the coating film of the localized layer is performed under the solvent atmosphere of 0.2-10 vol %, thus the time until the quaternary ammonium salt material, the metal oxide particle, or the conductive polymer, which is a conductive material in the coating film is localized to form a localized layer can be sufficiently obtained, and thus the localized layer can be easily produced.

Further, as the solvent used in the dry atmosphere at this time, at least one kind among the solvents contained in the coating liquid for forming a localized layer is preferably used. In the case where the solvent atmosphere is less than 0.2 vol %, the coating film is rapidly dried, and thus the localized layer may not be formed. On the other hand, in the case where the solvent atmosphere is more than 10 vol %, the drying time is required to be prolonged and thus there may be a tendency that the mass production is unsuitable.

As the quaternary ammonium salt material which is a conductive material contained in the localized layer, an acrylic-based material containing the quaternary ammonium salt material as a functional group in the molecule may be used suitably. The quaternary ammonium salt material has a structure of $—N^+ X^-$, and expresses the conductivity in a hard coat layer by containing quaternary ammonium cation ($—N^+$) and anion ($X^-$). At this time, examples of $X^-$ include $Cl^-$, $Br^-$, $I^-$, $F^-$, $HSO_4^-$, $SO_4^{2-}$, $NO_3^-$, $PO_4^{3-}$, $HPO_4^{2-}$, $H_2PO_4^-$, $SO_3^-$, and $OH^-$.

In addition, as the quaternary ammonium salt material, an acrylic-based material containing the quaternary ammonium salt material as a functional group in the molecule may also be used. As the acrylic-based material containing the quaternary ammonium salt material as a functional group in the molecule, a monofunctional or polyfunctional (meth)acrylate compound such as acrylic acid with a polyhydric alcohol or methacrylic acid ester containing a quaternary ammonium salt material ($—N^+ X^-$) as a functional group in the molecule, a polyfunctional urethane (meth)acrylate compound such as the one synthesized from hydroxyester of diisocyanate and polyhydric alcohol and acrylic acid or methacrylic acid and the like may be used. Further, in addition to these, as the ionizing radiation type material, a polyether resin, a polyester resin, an epoxy resin, an alkyd resin, a spiroacetal resin, a polybutadiene resin, a polythiol polyene resin and the like, which contain an acrylate-based functional group, may be used.

The molecular weight of the quaternary ammonium salt material contained in the localized layer of the present invention is preferably in the range of 1,000-100,000. By the setting of the weight average molecular weight of the quaternary ammonium salt material in the range of 1,000-100,000, a localized layer in which an intermediate layer, a hard coat layer, an antistatic layer, and a leveling layer are localized and stacked in this order from the side of the transparent substrate can be formed.

In addition, in the case where the molecular weight of the quaternary ammonium salt material is less than 1,000, the quaternary ammonium salt material becomes easily localized onto the surface of the localized layer, and the quaternary ammonium salt material exists on the surface of the localized layer. Accordingly, the low refractive index layer-forming material and the quaternary ammonium salt material are electrically repulsive each other, the adhesion between the localized layer and the low refractive index layer is reduced, and thus the excoriation resistance may be reduced. On the other hand, in the case where the weight average molecular weight of the quaternary ammonium salt material is more than 100,000, the hard coat layer and the antistatic layer are mixed each other, and the surface resistivity becomes worse. As the quaternary ammonium salt material, specifically, NR-121X-9IPA (manufactured by COLCOAT CO., Ltd.) and the like may be used.

As the metal oxide particle used as the conductive material, a metal oxide particle having conductivity, which contains as a major component, one kind or 2 or more kinds of metal oxides selected from zirconium oxide, antimony-containing tin oxide (ATO), phosphorus-containing tin oxide (PTO), tin-containing indium oxide, aluminum oxide, cerium oxide, zinc oxide, aluminum-containing zinc oxide, tin oxide, antimony-containing zinc oxide, and indium-containing zinc oxide, may be used.

As the conductive polymer used as the conductive material, one kind selected from or a mixture of 2 or more kinds selected from polyacethylene, polyaniline, polythiophene, polypyrrole, polyphenylene sulfide, poly(1,6-heptadiyne), polybiphenylene (polyparaphenylene), polyparaphenylene sulfide, polyphenyl acethylene, poly(2,5-thienylene) and a derivative thereof may be used.

A fluorocompound is added as a leveling material into the coating liquid for forming a localized layer. As the fluorocompound which is a leveling material, a compound containing a perfluoroalkyl group or a fluorinated alkenyl group can be suitably used. A perfluoroalkyl group has a structure of $—C_nF_{2n+1}$ (n=natural number) and functions as a hydrophobic/oleophobic group. Therefore, the fluorocompound has the characteristics of being rigid and hard to bend, and being orderly arrayed on the surface, and thus can function as a leveling material covering the surface with the small amount thereof. At this time, by the combination with a lipophilic group, the effect as the leveling material can further be increased. In addition, the perfluoroalkenyl group has C=C bond in the molecule and thus becomes bulky when arrayed on the surface, therefore, the density becomes lower as compared with a perfluoroalkyl group. Thus, the recoating inhibition, which perfluoro group has, can be suppressed.

Specifically, a fluorocompound which is a leveling material includes, FETERGENT 222F (manufactured by NEOS COMPANY LIMITED) containing a fluorinated alkenyl group, F470 (manufactured by DIC Corporation) containing a perfluoroalkyl group, and F489 (manufactured by DIC Corporation). In addition to these, V-8FM (manufactured by OSAKA ORGANIC CHEMICAL INDUSTRY LTD.) and the like can be used. Meanwhile, the fluorocompound which is a leveling material of the present invention is not limited to these.

Further, the coating liquid for forming a localized layer is added with a compound which has a siloxane bond as a leveling material. As the compound having a siloxane bond which is a leveling material, a silicone-based leveling agent which has a siloxane bond and organic modified part in the molecule can be used suitably. The compound which has a siloxane bond has a structure represented by (Chemical formula 1), and the surface tension thereof can be arbitrarily controlled with the changing of the n-number or the organic modified part in the siloxane bond (Chemical formula 1).

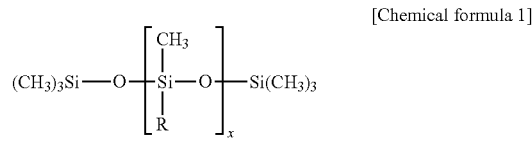

[Chemical formula 1]

As one of the examples changing the n-number or the organic modified part in the compound which has a siloxane bond (Chemical formula 1), a compound having a siloxane bond, which has a structure such as (Chemical formula 2), may also be used. The siloxane bond may be modified with the addition of a side chain. Further, as one example of $R^1$ in the structure of (Chemical formula 2), there are $CH_3$, $CH_2—CH_3$, $(CH_2)_9CH_3$, and the like. Furthermore, as one example of $R^2$, there are a polyether group, a polyester group, an aralkyl group, and the like. In addition, a compound having a siloxane bond, which has a structure such as (Chemical formula 3), can also be used. A siloxane bond is composed of a Si—O—Si bond, and as one example of $R^3$, average one polyether chain and the like may be used. In both (Chemical formula 2) and (Chemical formula 3), control of the surface tension and adjustment of the compatibility can be arbitrarily performed.

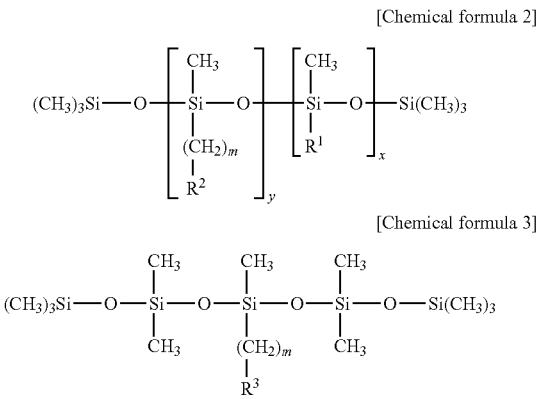

[Chemical formula 2]

[Chemical formula 3]

Examples of the compound which has a siloxane bond used as the leveling material specifically include BYK-300, BYK-306, BYK-307, BYK-310, BYK-315, BYK-322, BYK-323, BYK-325, BYK-330, BYK-331, BYK-333, BYK-337, BYK-341, BYK-344, BYK-345, BYK-347, BYK-348, BYK-349, BYK-370, BYK-375, BYK-377, BYK-378, BYK-UV3500, BYK-UV3510, BYK-UV3570, BYK-Silclean3700, and BYK-Silclean3720 (manufactured by BYK Japan KK). Further, included are TSF410, TSF411, TSF4700, TSF4701, XF42-B0970, TSF4730, YF3965, TSF4421, XF42-334, XF42-B3629, XF42-A3161, TSF4440, TSF4441, TSF4445, TSF4450, TSF4446, TSF4452, and TSF4460 (manufactured by Momentive Specialty Chemicals Inc.). Furthermore, included are POLYFLOW KL-400X, POLYFLOW KL-400HL, POLYFLOW KL-401, POLYFLOW KL-402, POLYFLOW KL-403, and POLYFLOW KL-404 (manufactured by KYOEISHA CHEMICAL Co., LTD.). Meanwhile, the compound which has a siloxane bond used as a leveling material is not limited to these.

In addition, in the case where the coating liquid for forming a localized layer is cured by ultraviolet light, a photoinitiator is added into the coating liquid for forming a localized layer.

As the photoinitiator, those generating radical when ultraviolet irradiation was performed, for example, acetophenones, benzoins, benzophenones, phosphine oxides, ketals, anthraquinones, and thioxanthones may be used. Further, the addition amount of the photoinitiator is preferably in the range of 0.1-10 wt %, and more preferably in the range of 1-8.5 wt % with respect to the amount of the ionizing radiation curable material.

In addition, a surface conditioner, a refractive index adjusting agent, an adhesion promoting agent, a curing agent, and the like may also be added as an additive into the coating liquid for forming a localized layer.

The coating liquid for forming a localized layer obtained by adjusting the materials described above is applied on the transparent substrate by a wet film-forming method to form a coating film, and thereby to form the localized layer. Hereinafter, a method of forming the localized layer will be described.

The coating liquid for forming a localized layer is applied on the transparent substrate to form a coating film. As the coating method for applying the coating liquid for forming a localized layer on the transparent substrate, a coating method using a roll coater, a reverse roll coater, a gravure coater, a microgravure coater, a knife coater, a bar coater, a wire bar coater, a die coater, or a dip coater may be used. Further, the localized layer (12) of the present invention is a thin coating film and is required to have uniform film thickness, therefore, a microgravure coater method or die coater method is preferably used.

Next, the coating film of the localized layer formed on the transparent substrate is dried, and thus the solvent in the coating film can be removed. At this time, as the drying measures, heating, blast, hot air and the like may be used.

Meanwhile, as for the drying process, the primary drying is preferably performed at the drying temperature in the range of 15-30° C. immediately after the application. By the setting of the primary drying temperature in the range of 15-30° C., the time until the conductive material and the leveling material in the coating film of the localized layer are localized to form the localized layer can be sufficiently obtained.

Meanwhile, in the case where the drying temperature is higher than 30° C., there may be a risk that the coating film of the localized layer is rapidly dried, and thus the localized layer can not be formed. On the other hand, in the case where the drying temperature is lower than 15° C., the drying time is required to be prolonged and thus there may be a tendency that the continuous production is unsuitable.

In addition, the secondary drying is preferably performed at the drying temperature in the range of 50-150° C. By the setting of the secondary drying temperature in the range of 50-150° C., a localized layer in which an intermediate layer, a hard coat layer, an antistatic layer and a leveling layer are localized and stacked in this order from the side of the transparent substrate can be formed.

Meanwhile, in the case where the drying temperature is higher than 150° C., the evaporation rate of the solvent is extremely fast, and thus the surface of the localized layer becomes rough, therefore, there may be a risk that the haze occurs. On the other hand, in the case where the drying temperature is lower than 50° C., the solvent remains in the localized layer, and the localized layer becomes to have no hard coating property.

In addition, the drying may be insufficient with only the primary drying, therefore, appropriate heat drying may be performed at the drying temperature in the range of 50-150° C. also as the secondary drying after the primary drying.

In the drying process, the primary drying and the secondary drying are performed at the drying temperatures described above, and thus the localized layer (12) can be easily produced.

In addition, in order to perform the isolation of each layer of the localized layer, the primary drying is performed. As the secondary drying, the heat drying is appropriately performed at the drying temperature in the range of 50-150° C. thereby to remove the solvent.

Further, the time from the formation of the coating film which is composed of the coating liquid for forming a localized layer and formed on the transparent substrate until the solvent contained in the coating film of the localized layer on the transparent substrate becomes 10 wt % or less is preferably in the range of 2-60 seconds. By the setting of the time from the formation of the coating film of the localized layer on the transparent substrate until the solvent contained in the coating film which is composed of the coating liquid for forming a localized layer on the transparent substrate becomes 10 wt % or less in the range of 2-60 seconds, the time until the conductive material and the leveling material in the coating film are localized to form a localized layer can be sufficiently obtained, and thus a localized layer (12) can be easily formed.

In addition, in the case where the time until the solvent contained in the coating film of the localized layer becomes 10 wt % or less is less than 2 seconds, the coating film of the localized layer is rapidly dried, and thus the antistatic layer and the leveling layer may not be formed.

Further, in the case where the time until the solvent contained in the coating film of the localized layer becomes 10 wt % or less is more than 60 seconds, it is extremely time-consuming, and thus this process is not practical. Even in the case where the localized layer is formed by a single sheet system, the cycle time becomes long, and the productivity is reduced, therefore, the process is not preferable.

Next, the coating film obtained with the application of the coating liquid for forming a localized layer on the transparent substrate is irradiated with ionizing radiation to form a localized layer (12).

As the ionizing radiation, ultraviolet light or electron beam may be used. In the case of ultraviolet light curing, a light source such as a high-pressure mercury vapor lamp, a low-pressure mercury vapor lamp, an ultrahigh-pressure mercury vapor lamp, a metal halide lamp, a carbon-arc, and a xenon arc may be used. Further, in the case of electron beam curing, electron beam emitted from various types of electron beam accelerators such as Cockcroft-Walton type, Van de Graaff type, resonance transformation type, insulated core transformer type, linear type, dynamitron type, and high-frequency type may be used. The energy of electron beam is preferably 50 to 1,000 keV. The energy of electron beam is more preferably 100 to 300 keV.

Next, a method of forming a low refractive index layer will be described.

The low refractive index layer is formed by a wet film-forming method with the application of the coating liquid for forming a low refractive index layer containing a low refractive index layer-forming material onto the surface of the localized layer. At this time, the film thickness (d) of the low refractive index layer is designed so that the optical film thickness (nd) obtained by multiplying the film thickness (d) by the refractive index (n) of the low refractive index layer is equal to ¼ of the wavelength of visible light.

As the low refractive index layer-forming material, a low refractive index particle and a binder matrix-forming material may be used. Further, in the case where the binder matrix-forming material has low refractive index, a low refractive index particle may not be contained in the low refractive index forming material. As the binder matrix-forming material in the low refractive index layer (13), an ionizing radiation curable material and a heat curable material may be used.

As the low refractive particle that can be contained in the coating liquid for the low refractive index layer-forming material, a low refractive index particle composed of a low refraction material such as LiF, MgF, 3NaF.AlF or AlF (the refractive index is 1.40 for any one of them), or $Na_3AlF_6$ (refractive index is 1.33 for cryolite) may be used. In addition, a particle having voids inside the particle may be suitably used. In the particle having voids inside the particle, the portion of the void can be determined to have the refractive index of air ($\approx$1), therefore, a low refractive index particle having extremely low refractive index can be obtained. Specifically, a low refractive index silica particle having voids inside thereof may be used.

In the particle having voids inside the particle, the portion of the void can be determined to have the refractive index of air ($\approx$1), therefore, a low refractive index particle having extremely low refractive index can be obtained. As the low refractive index silica particle having voids inside thereof, a porous silica particle or a silica particle having a shell structure may be used.

In addition, as the low refractive index particle, the particle size is preferably 1-100 nm. In the case where the particle size is more than 100 nm, there is a tendency that the light is significantly reflected by Rayleigh scattering, and the low refractive index layer whitens and thus the transparency of the anti-reflection film is reduced. On the other hand, in the case where the particle size is less than 1 nm, there will be a problem such as non-uniformity of particles in the low refractive index layer due to the agglomeration of the particles.

Further, as one example of the low refractive index silica particle having voids inside thereof, the one that while maintaining the spherical shape, has the refractive index of 1.35 which is lower as compared with the refractive index of glass of 1.45, the spherical structure having the radius of 20-25 nm and the density ($\rho1$) in the central portion thereof, the periphery being covered with a layer having the thickness of 10-15 nm and the different density ($\rho2$), the value ($\rho1/\rho2$) showing 0.5, 0.1 or 0.0, and a structure where the central portion of the low refractive index silica particle has the density of around ⅒ of the density of external silica, may be used.

Further, as the ionizing radiation curable material used as the binder matrix-forming material, an acrylic-based material may be used. As the acrylic-based material, monofunctional or polyfunctional (meth)acrylate compounds such as acrylic acid with a polyhydric alcohol, or methacrylic acid ester, and polyfunctional urethane (meth)acrylate compounds such as those synthesized from hydroxyester of diisocyanate and polyhydric alcohol and acrylic acid or methacrylic acid, and the like may be used. Father, in addition to these, as the ionizing radiation type material, a polyether resin, a polyester resin, an epoxy resin, an alkyd resin, a spiroacetal resin, a polybutadiene resin, a polythiol polyene resin and the like, which contain an acrylate-based functional group, may be used.

Examples of the monofunctional (meth)acrylate compound include, for example, 2-hydroxyethyl (meth)acrylate, 2-hydroxypropyl (meth)acrylate, 2-hydroxybutyl (meth)acrylate, n-butyl (meth)acrylate, isobutyl (meth)acrylate, t-butyl (meth)acrylate, glycidyl (meth)acrylate, acryloyl morpholine, N-vinyl pyrrolidone, tetrahydrofurfuryl acrylate, cyclohexyl (meth)acrylate, 2-ethylhexyl (meth)acrylate, isobornyl (meth)acrylate, isodecyl (meth)acrylate, lauryl (meth)acrylate, tridecyl (meth)acrylate, cetyl (meth)acrylate, stearyl (meth)acrylate, benzyl (meth)acrylate, 2-ethoxyethyl (meth)acrylate, 3-methoxybutyl (meth)acrylate, ethylcarbitol (meth)acrylate, phosphoric acid (meth)acrylate, ethylene oxide-modified phosphoric acid (meth)acrylate, phenoxy (meth)acrylate, ethylene oxide-modified phenoxy (meth)acrylate, propylene oxide-modified phenoxy (meth)acrylate, nonyl phenol (meth)acrylate, ethylene oxide-modified nonyl phenol (meth)acrylate, propylene oxide-modified nonyl phenol (meth)acrylate, methoxy diethylene glycol (meth)acrylate, methoxy polythylene glycol (meth)acrylate, methoxypropylene glycol (meth)acrylate, 2-(meth)acryloyloxyethyl-2-hydroxypropylphthalate, 2-hydroxy-3-phenoxy propyl (meth)acrylate, 2-(meth)acryloyloxyethyl hydrogen phthalate, 2-(meth)acryloyloxypropyl hydrogen phthalate, 2-(meth)acryloyloxypropyl hexahydrohydrogen phthalate, 2-(meth)acryloyloxypropyl tetrahydrohydrogen phthalate, dimethylaminoethyl (meth)acrylate, trifluoroethyl (meth)acrylate, tetrafluoropropyl (meth)acrylate, hexafluoropropyl (meth)acrylate, octafluoropropyl (meth)acrylate, octafluoropropyl (meth)acrylate, and adamantane derivative mono(meth)acrylate such as adamantyl acrylate having monovalent mono(meth)acrylate derived from 2-adamantane and adamantanediol.

Examples of the di-functional (meth)acrylate compound include, for example, di(meth)acrylate such as ethylene glycol di(meth)acrylate, diethylene glycol di(meth)acrylate, butanediol di(meth)acrylate, hexanediol di(meth)acrylate, nonanediol di(meth)acrylate, ethoxylated hexanediol di(meth)acrylate, propoxylated hexanediol di(meth)acrylate, diethylene glycol di(meth)acrylate, polyethylene glycol di(meth)acrylate, tripropylene glycol di(meth)acrylate, polypropylene glycol di(meth)acrylate, neopentyl glycol di(meth)acrylate, ethoxylated neopentyl glycol di(meth) acrylate, tripropylene glycol di(meth)acrylate, hydroxypivalic acid neopentyl glycol di(meth)acrylate.

Examples of the tri- or higher-functional (meth)acrylate compound include, for example, tri(meth)acrylate such as trimethylol propane tri(meth)acrylate, ethoxylated trimethylol propane tri(meth)acrylate, propoxylated trimethylol propane tri(meth)acrylate, tris 2-hydroxyethylisocyanurate tri (meth)acrylate and glycerin tri(meth)acrylate; a tri-functional (meth)acrylate compound such as pentaerythritol tri(meth)acrylate, dipentaerythritol tri(meth)acrylate and ditrimethylol propane tri(meth)acrylate; a tri-functional or higher-functional of polyfunctional (meth)acrylate compound such as pentaerythritol tetra(meth)acrylate, ditrimethylol propane tetra(meth)acrylate, dipentaerythritol tetra (meth)acrylate, dipentaerythritol penta(meth)acrylate, ditrimethylol propane penta(meth)acrylate, dipentaerythritol hexa(meth)acrylate and ditrimethylol propane hexa(meth) acrylate; a polyfunctional (meth)acrylate compound obtained by substituting part of these (meth)acrylates with an alkyl group or ε-caprolactone.

Among the acrylic-based materials, polyfunctional urethane acrylate may be suitably used for the reason that intended molecular weight and molecule structure can be designed, and the physical properties of the formed hard coat layer can be easily balanced. The urethane acrylate can be obtained with the reaction of polyhydric alcohol, polyhydric isocyanate and acrylate containing a hydroxy group.

Further, in addition to the ionizing radiation curable material, a thermoplastic resin and the like may also be added. As the thermoplastic resin, a cellulose derivative such as acetyl cellulose, nitrocellulose, acetyl butyl cellulose, ethylcellulose, and methylcellulose; vinyl-based resins such as vinyl acetate and a copolymer thereof, vinyl chloride and a copolymer thereof, and vinylidene chloride and a copolymer thereof; acetal resins such as polyvinyl formal, and polyvinyl butyral; acrylic-based resins such as an acrylic resin and a copolymer thereof, and a methacrylic resin and a copolymer thereof; a polystyrene resin; a polyamide resin; a linear polyester resin; a polycarbonate resin; and the like may be added to suppress the curling of the film to be produced.

In addition, into the low refractive index layer-forming material, a water-repellent material may be added with the purpose that the dirt such as fingerprints hardly adheres onto the surface of the anti-reflection film and the adhered dirt is easily cleaned away. As the water-repellent material, silicone-based materials, organic silicon compounds or UV curable water-repellent agents may be used. As the silicone-based material, alkylaralkyl-modified silicone oil, alkyl-modified silicone oil, polyether-modified silicone oil, and alkyl polyether-modified silicone oil may also be used. Furthermore, an organic silicon compound containing no fluorine and no (meth)acrylic group may also be used. Specifically, an alkylalkoxy silane compound, a silane siloxane compound, a polyester group-containing silane compound, polyether group-containing silane compound or a siloxane compound may also be used. In addition, as the UV curable water-repellent agent, BYK-350 or BYK-3500 (manufactured by BYK Japan KK), F470 (manufactured by DIC Corporation) and the like may be used.

In addition, as the binder matrix-forming material, a hydrolysate of silicon alkoxide which is a heat curable material may be used. Specifically, a hydrolysate of silicon alkoxide represented by general formula (A) $R_xSi(OR)_{4-x}$, (wherein R represents an alkyl group and x is an integer satisfying $0 \le x \le 3$) may be used.

Examples of the silicon alkoxide represented by general formula (A) include, for example, tetramethoxy silane, tetraethoxysilane, tetra-iso-propoxysilane, tetra-n-propoxy silane, tetra-n-butoxy silane, tetra-sec-butoxy silane, tetra-tert-butoxy silane, tetrapentaethoxy silane, tetrapenta-iso-propoxy silane, tetrapenta-n-proxy silane, tetrapenta-n-butoxy silane, tetrapenta-sec-butoxy silane, tetrapenta-tert-butoxy silane, methyltrimethoxy silane, methyltriethoxy silane, methyltripropoxy silane, methyltributoxy silane, dimethyldimethoxy silane, dimethyldiethoxy silane, dimethylethoxy silane, dimethylmethoxy silane, dimethylpropoxy silane, dimethylbutoxysilane, methyldimethoxysilane, methyldiethoxy silane, and hexyltrimethoxy silane. Any hydrolysates of silicon alkoxide may be acceptable as long as they are obtained with the use of a metal alkoxide represented by general formula (B) as a raw material, for example, those obtained by hydrolysis with the use of hydrochloric acid may be acceptable.

As the binder matrix-forming material, in the case where a hydrolysate of silicon alkoxide which is a heat curable material is used, a hydrolysate of silicon alkoxide represented by general formula (B) $R'_zSi(OR)_{4-z}$ (wherein R' represents a non-reactive functional group containing an alkyl group, a fluoroalkyl group, or a fluoroalkylene oxide group, and z is an integer satisfying $1 \le z \le 3$), which is a fluorine compound, may further be contained as the water-repellent material. With the use of the hydrolysate of silicon alkoxide represented by general formula (B), an antifouling property can be provided onto the surface of the low refractive index layer of the anti-reflection film. Furthermore, the refractive index of the low refractive index layer can further be reduced. Examples of the silicon alkoxide represented by general formula (C) include, for example, octadecyl trimethoxy silane, and 1H,1H,2H,2H-perfluorooctyltrimethoxy silane.

The solvent contained in the coating liquid for forming a low refractive index layer is appropriately selected from aromatic hydrocarbons such as toluene, xylene, cyclohexane and cyclohexyl benzene; hydrocarbons such as n-hexane; ethers such as dibutyl ether, dimethoxymethane, dimethoxyethane, diethoxyethane, propylene oxide, dioxane, dioxolane, trioxane, tetrahydrofuran, anisole, and phenetol; further, ketones such as methyl isobutyl ketone, methyl butyl ketone, acetone, methyl ethyl ketone, diethyl ketone, dipropyl ketone, diisobutyl ketone, cyclopentanone, cyclohexanone, methyl cyclohexanone, and methyl cyclohexanone; furthermore, esters such as ethyl formate, propyl formate, n-pentyl formate, methyl acetate, ethyl acetate, methyl propionate, ethyl propionate, n-pentyl acetate, and γ-butyrolactone; still further cellosolves such as methyl cellosolve, cellosolve, butyl cellosolve, and cellosolve acetic acid; alcohols such as methanol, ethanol and isopropyl alcohol; water; and the like, in consideration of coating suitability and the like.

In addition, in the case where the curing is performed with ultraviolet light with the use of an ionizing radiation curable material which is used as the binder matrix-forming material, a photoinitiator is added to the coating liquid for forming a low refractive index layer.

As the photoinitiator, any photoinitiators may be acceptable as long as they generate radicals when ultraviolet irradiation was performed, and for example, acetophenones, benzoins, benzophenones, phosphine oxides, ketals, anthraquinones, and thioxanthones may be used. In addition, the addition amount of the photoinitiator is preferably in the range of 0.1-10 wt %, and more preferably 1-8.5 wt % with respect to the ionizing radiation curable material.

Further, as an additive to the coating liquid for forming a low refractive index layer, a surface conditioner, a refractive index adjusting agent, an adhesion promoting agent, a curing agent and the like may also be added.

With the application of the coating liquid for forming a low refractive index layer obtained by the adjustment of the materials described above on the localized layer (12) by a wet film-forming method to form a coating film of low refractive index layer, and thus a low refractive index layer (13) can be formed. Hereinafter, a method of forming the low refractive index layer will be described.

The coating liquid for forming a low refractive index layer is applied on the localized layer (12) to form a coating film of the low refractive index layer. As the coating method for applying the coating liquid for forming a low refractive index layer on the localized layer, a coating method using a roll coater, a reverse roll coater, a gravure coater, a microgravure coater, a knife coater, a bar coater, a wire bar coater, a die coater or a dip coater may be used. Further, the low refractive index layer (13) of the present invention is a thin coating film and is required to have uniform film thickness, therefore, a microgravure coater method is preferably used.

Next, the coating film of the low refractive index layer formed on the localized layer (12) is dried, and thus the solvent in the coating film is removed. At this time, as the drying measures, heating, blast, hot air and the like may be used. Further, appropriate heat drying is preferably performed at a drying temperature in the range of 50° C.-150° C.

Next, in the case where an ionizing radiation curable material is used as the binder matrix-forming material, the coating film of the low refractive index layer which is obtained with the application of the coating liquid for forming a low refractive index layer on the localized layer is irradiated with ionizing radiation, and thus the low refractive index layer (13) is formed.

As the ionizing radiation, ultraviolet light or electron beam may be used. In the case of the ultraviolet light curing, a light source such as a high-pressure mercury vapor lamp, a low-pressure mercury vapor lamp, an ultrahigh-pressure mercury vapor lamp, a metal halide lamp, a carbon-arc, and a xenon arc may be used. Further, in the case of the electron beam curing, electron beam emitted from various types of electron beam accelerators such as Cockcroft-Walton type, Van de Graaff type, resonance transformation type, insulated core transformer type, linear type, dynamitron type and high-frequency type may be used. The energy of electron beam is preferably 50 to 1,000 keV. The energy of electron beam is more preferably 100 to 300 keV.

The anti-reflection film of the present invention is continuously formed in a roll-to-roll method process. As shown in FIG. 2, a wound web-like transparent substrate is continuously run from an unwinder (31) to a rewinder (32), at this time, the transparent substrate is passed through a coating unit (21), a drying unit (22), and an ionizing radiation irradiating unit (23), and thus a localized layer is continuously formed on the transparent substrate. Subsequently, a low refractive index layer is passed through the units in the same manner, and thus the low refractive index layer is formed on the localized layer, thereby to produce the anti-reflection film.

EXAMPLES

First, evaluation methods for the anti-reflection film obtained in Examples of the present invention will be described.

"Measurement of Average Luminous Reflectance"

The low refractive index layer-forming surface of the obtained anti-reflection film and the opposite surface thereof were applied with black matte spray into black color. After the application, the spectral reflectance at the incidence angle of 5° under the conditions of C light source and 2 degree field of view was measured for the low refractive index layer-forming surface measured with the use of an automatic spectralphotometer (trade name: U-4000, manufactured by Hitachi, Ltd.). From the obtained spectral reflectance, the average luminous reflectance (Y %) was calculated. In addition, as the relative luminous efficiency, photopic spectral luminous efficiency was used.

"Measurement of Haze (H) and Parallel Light Transmittance"

As for the obtained anti-reflection film, the haze (H) and the parallel light transmittance were measured with the use of a haze turbidimeter (trade name: NDH-2000, manufactured by NIPPON DENSHOKU INDUSTRIES CO.,LTD.).

"Measurement of Surface Resistivity"

As for the surface of the low refractive index layer of the obtained anti-reflection film, the measurement was performed with a high resistivity measurement meter (trade name: Hiresta MCP-HT260, manufactured by Dia Instruments Co., Ltd.) in accordance with JIS-K6911 (1995).

"Measurement of Contact Angle"

As for the surface of the localized layer and the surface of the low refractive index layer of the obtained anti-reflection film, droplets having 1.8 mm in diameter were made at a needle tip in the dry state (20° C., 65% RH) with the use of a contact angle meter (CA-X type, manufactured by Kyowa Interface Science Co., LTD.), and the droplets were brought into contact on the surface of a sample (solid) to make droplets. The contact angle is an angle between the tangential line to the liquid surface and the solid surface at the contact point of the solid and the liquid, and was defined as angular degree at the liquid-containing side. As the liquid, distilled water was used. Further, the method of measuring contact angle of pure water was measured in accordance with JIS-R3257.

"Measurement of Pencil Hardness"

In accordance with JIS K5600-5-4 (1999), the pencil hardness of the surface of the localized layer of each anti-reflection film was measured with a load of 500 g.

"Evaluation of Color Irregularity and Interference Fringes"

As for the obtained anti-reflection film, a fluorescent lamp was reflected on the surface of the low refractive index layer, and with the observation of the reflected light, the color irregularity and the interference irregularity were confirmed.

Evaluations by visual confirmation were performed on the following criteria.

○: Color irregularity and interference fringes were good.

x: Color irregularity and interference fringes were not good.

"Evaluation of Excoriation Resistance (Steel Wool (SW))"

As for the surface of the low refractive index layer of the obtained anti-reflection film, back and forth rubbing was performed 10 times with the use of steel wool (trade name: Bonstar #0000, manufactured by Nihon Steel Wool Co., Ltd.) with a load of 500 g/cm$^2$ on the surface of the low refractive index layer of an optical layered body with the use of a color fastness rubbing tester (trade name: AB-301, manufactured by TESTER SANGYO CO,. LTD.), and the changes of the appearance such as rubbing marks, scars and the like were visually evaluated.

Evaluations by visual confirmation were performed on the following criteria.

○: Scars were not confirmed.

x: Scars were confirmed.

"Measurement of Pencil Hardness"

As for the surface of the localized layer of the obtained anti-reflection film, pencil hardness test was performed in accordance with JIS K5600-5-4 (1999), and the pencil hardness was determined.

Determination of the intermediate layer, the hard coat layer, the antistatic layer and the leveling layer in the localized layer was performed on the following determination criteria.

"Confirmation of Intermediate Layer in Localized Layer"

From the spectral reflectance determined in the section on "Measurement of average luminous reflectance", the presence or absence of the intermediate layer was determined. Specifically, in the case where an interference peak corresponding to the film thickness of the localized layer in the obtained spectral reflectance curve was not confirmed, it was determined that the intermediate layer was present, while in the case where an interference peak corresponding to the film thickness of the localized layer was confirmed, it was determined that the intermediate layer was absent.

○: Presence of intermediate layer (absence of interference peak)

x: Absence of intermediate layer (presence of interference peak)

"Confirmation of Hard Coat Layer in Localized Layer"

From the pencil hardness of the surface of the localized layer determined in the section on "Measurement of pencil hardness", in the case where the pencil hardness of the surface of the localized layer was H or more, it was determined that the hard coat layer was present, while in the case where the pencil hardness was less than H, it was determined that the hard coat layer was absent.

○: Presence of hard coat layer (pencil hardness of H or more)

x: Absence of hard coat layer (pencil hardness of less than H)

"Confirmation of Antistatic Layer in Localized Layer"

From the surface resistivity determined in the section on "Measurement of surface resistivity", the presence or absence of the antistatic layer was determined. In the case where the surface resistivity was $1 \times 10^{12} \Omega/\square$ or less, it was determined that the antistatic layer was present, while in the case where the surface resistivity was more than $1 \times 10^{12} \Omega/\square$, it was determined that the antistatic layer was absent.

○: Presence of antistatic layer (surface resistivity of $1 \times 10^{12} \Omega/\square$ or less)

x: Absence of antistatic layer (surface resistivity of more than $1 \times 10^{12} \Omega/\square$)

Meanwhile, "Confirmation of antistatic layer in localized layer" was not performed for an anti-reflection film in which conductive material had not added to the coating liquid for forming a localized layer.

"Confirmation of Leveling Layer in Localized Layer"

The presence of the leveling layer was confirmed with the contact angle on the surface of the localized layer with the use of an X-ray photoelectron spectroscopy. A method of measuring the contact angle on the surface of the localized layer is as described in the section on "Measurement of contact angle". The presence of the leveling layer was determined by performing the surface analysis of the surface of the localized layer with the use of an X-ray photoelectron spectroscopy (trade name: JPS-90MXV micro, manufactured by JEOL Ltd.). In the case where the contact angle was 60° or more, an element specific to the leveling material was detected and an element specific to the conductive material was not detected in XPS measurement, it was determined that the leveling layer was present, while in the case where the contact angle was less than 60° and/or chlorine was detected in the surface analysis by XPS, it was determined that the leveling layer was absent. Further, in the case where the ratio of the atomic weight was 0.1 atomic % or less, it was determined that the leveling layer was undetectable. Meanwhile, the X-ray intensity in the measurement was set to 100 W (10 kV, 10 mA).

○: Presence of leveling layer (contact angle was 65° or more, element specific to leveling material was detectable, and element specific to conductive material was undetectable)

x: Absence of leveling layer (other than those described above)

Further, the element specific to the leveling material is as follows.

Fluorocompound: F

Compound which has a siloxane bond: Si

Further, the element specific to the conductive material is as follows.

Quaternary ammonium salt material: Cl

Metal oxide particle (antimony-containing tin oxide): Sn

Metal oxide particle (phosphorus-containing tin oxide): Sn

Conductive polymer (polythiophene): S

Conductive polymer (polyaniline): N

Next, a method of preparing the anti-reflection film prepared in Examples of the present invention will be described.

(A) Leveling Material: Fluorocompound×Conductive Material: Quaternary Ammonium Salt Material Hereinafter, Examples in which a fluorocompound is used as a leveling material and a quaternary ammonium salt material is used as the conductive material, are described.

Hereinafter, Preparation Examples of the coating liquids for forming a localized layer A1 to A13 are described.

Synthesis Example 1

Into a four-necked flask equipped with stirring blades, a reflux cooling tube, a dry air introduction tube, and a thermometer,

| | |
|---|---|
| octylpolyethylene glycol polypropylene glycol methacrylate (trade name: "BLEMMER 50POEP-800B", manufactured by NOF CORPORATION) | 18.0 g |
| methacryloyl oxyethyltrimethyl ammonium chloride | 35.0 g |
| cyclohexyl methacrylate | 14.0 g |
| azobisisobutyronitrile | 0.3 g |
| isopropyl alcohol | 100.0 g |
| methyl ethyl ketone | 40.0 g | were charged, and the mixture in the flask was polymerized at 65° C. for 3 hours under a nitrogen atmosphere. After the completion of the polymerization, the reaction mixture was put into hexane, and a product was precipitated, and then the product was dried. The weight average molecular weight of the obtained quaternary ammonium salt material was 18,500.

Preparation Example A1

(Coating Fluid for Forming Localized Layer A1)

With respect to 100 parts by weight of urethane acrylate (trade name: UA-306T, manufactured by KYOEISHA CHEMICAL Co., LTD.), a mixture of

| | |
|---|---|
| quaternary ammonium salt material (molecular weight: 18,500) produced in Synthesis Example 1 | 10 parts by weight |
| F470 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer A1.

Preparation Example A2

(Coating Fluid for Forming Localized Layer A2)

With respect to 100 parts by weight of urethane acrylate (trade name: UA-306T, manufactured by KYOEISHA CHEMICAL Co., LTD.), a mixture of

| | |
|---|---|
| NR-121X-9IPA | 20 parts by weight |
| F470 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer A2.

Preparation Example A3

(Coating Fluid for Forming Localized Layer A3)

With respect to 100 parts by weight of urethane acrylate (trade name: UA-306T, manufactured by KYOEISHA CHEMICAL Co., LTD.), a mixture of

| | |
|---|---|
| quaternary ammonium salt material produced in Synthesis Example 1 (molecular weight: 18,500) | 10 parts by weight |
| F489 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer A3.

Preparation Example A4

(Coating Fluid for Forming Localized Layer A4)

With respect to 100 parts by weight of urethane acrylate (trade name: UA-306T, manufactured by KYOEISHA CHEMICAL Co., LTD.), a mixture of

| | |
|---|---|
| quaternary ammonium salt material produced in Synthesis Example 1 (molecular weight 18,500) | 10 parts by weight |
| FETERGENT 222F | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer A4.

Preparation Example A5

(Coating Fluid for Forming Localized Layer A5)

With respect to 100 parts by weight of urethane acrylate (trade name: UA-306T, manufactured by KYOEISHA CHEMICAL Co., LTD.), a mixture of

| | |
|---|---|
| LIGHT ESTER DQ100 (molecular weight: 208) | 10 parts by weight |
| F470 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer A5.

Preparation Example A6

(Coating Fluid for Forming Localized Layer A6)

With respect to 100 parts by weight of urethane acrylate (trade name: UA-306T, manufactured by KYOEISHA CHEMICAL Co., LTD.), a mixture of

| | |
|---|---|
| p-styrene sulfonic acid ammonium salt (molecular weight: 120,000) | 10 parts by weight |
| F470 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer A6.

Preparation Example A7

(Coating Fluid for Forming Localized Layer A7)

With respect to 100 parts by weight of urethane acrylate (trade name: UA-306T, manufactured by KYOEISHA CHEMICAL Co., LTD.), a mixture of

| | |
|---|---|
| quaternary ammonium salt material produced in Synthesis Example 1 (molecular weight: 18,500) | 0.01 part by weight |
| F470 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer A7.

Preparation Example A8

(Coating fluid for forming localized layer A8)
With respect to 100 parts by weight of urethane acrylate (trade name: UA-306T, manufactured by KYOEISHA CHEMICAL Co., LTD.), a mixture of

| | |
|---|---|
| quaternary ammonium salt material produced in Synthesis Example 1 (molecular weight: 18,500) | 0.01 part by weight |
| F470 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer A8.

Preparation Example A9

(Coating Fluid for Forming Localized Layer A9)
With respect to 100 parts by weight of urethane acrylate (trade name: UA-306T, manufactured by KYOEISHA CHEMICAL Co., LTD.), a mixture of

| | |
|---|---|
| quaternary ammonium salt material produced in Synthesis Example 1 (molecular weight: 18,500) | 10 parts by weight |
| F470 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of isopropyl alcohol, the solution was named as coating liquid for forming a localized layer A9.

Preparation Example A10

(Coating Fluid for Forming Localized Layer A10)
With respect to 100 parts by weight of urethane acrylate (trade name: UA-306T, manufactured by KYOEISHA CHEMICAL Co., LTD.), a mixture of

| | |
|---|---|
| quaternary ammonium salt material produced in Synthesis Example 1 (molecular weight: 18,500) | 10 parts by weight |
| F470 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 20 wt % with the use of methyl ethyl ketone, the solution was named as coating liquid for forming a localized layer A10.

Preparation Example A11

(Coating fluid for forming localized layer A11)
With respect to 100 parts by weight of urethane acrylate (trade name: UA-306T, manufactured by KYOEISHA CHEMICAL Co., LTD.), a mixture of

| | |
|---|---|
| quaternary ammonium salt material produced in Synthesis Example 1 (molecular weight: 18,500) | 10 parts by weight |
| F470 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 90 wt % with the use of methyl ethyl ketone, the solution was named as coating liquid for forming a localized layer A11.

Preparation Example A12

(Coating Fluid for Forming Localized Layer A12)
With respect to 100 parts by weight of urethane acrylate (trade name: UA-306T, manufactured by KYOEISHA CHEMICAL Co., LTD.), a mixture of

| | |
|---|---|
| quaternary ammonium salt material produced in Synthesis Example 1 (molecular weight: 18,500) | 10 parts by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer A12.

Preparation Example A13

(Coating Fluid for Forming Localized Layer A13)
With respect to 100 parts by weight of urethane acrylate (trade name: UA-306T, manufactured by KYOEISHA CHEMICAL Co., LTD.), a mixture of

| | |
|---|---|
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer A13.

Hereinafter, Preparation Examples of the coating liquid for forming a low refractive index layer A are described.

(Coating Fluid for Forming Low Refractive Index Layer A)
A mixture of

| | |
|---|---|
| dispersion liquid of porous silica fine particles (having an average particle size of 50 nm/the solid content of 20 wt %/methyl isobutyl ketone dispersion liquid) (solid content) | 2.5 parts by weight |

-continued

| | |
|---|---|
| EO-modified dipentaerythritol hexaacrylate (trade name: DPEA-12, manufactured by NIPPON KAYAKU Co., Ltd.) | 2.5 parts by weight |
| photoinitiator (trade name: IRGACURE 184, manufactured by Ciba Japan K.K.) | 0.1 part by weight | was prepared, and then the mixture was adjusted so as to be a solution with the solid content of 5 wt % with the use of isopropyl alcohol, the solution was named as coating liquid for forming a low refractive index layer A.

Example A1

(Formation of Localized Layer)

Onto one surface of a triacetyl cellulose film (manufactured by FUJIFILM Corporation, the film thickness of 80 μm), the coating liquid for forming a localized layer A1 was applied. The applied surface was dried at 25° C. for 10 seconds in a drying oven as primary drying, continuously at 80° C. for 50 seconds in a drying oven as secondary drying, and then irradiated with ultraviolet light with the use of an ultraviolet irradiation apparatus (manufactured by Fusion UV Systems Japan KK., light source: H bulb) at an irradiation dose of 300 mJ/m², thereby to form a transparent localized layer with the dry film thickness of 5 μm.

(Formation of Low Refractive Index Layer)

Onto the localized layer formed above, the coating liquid for forming a low refractive index layer A was applied so that the film thickness after the drying became 100 nm. The applied surface was dried at the primary drying temperature of 25° C. for 25 seconds and then at the secondary drying temperature of 80° C. for 50 seconds, and then irradiated with ultraviolet light with the use of an ultraviolet irradiation apparatus (manufactured by Fusion UV Systems Japan KK., light source: H bulb) at an irradiation dose of 192 mJ/m² to cure the film, thereby to form a low refractive index layer, and the anti-reflection film of [Example A1] was prepared.

Example A2 to Example A11

In [Example A2] to [Example A11], with the use of the coating liquids for forming a localized layer A2 to A11 instead of the coating liquid for forming a localized layer A1, and with the other production conditions being the same as those in [Example A1], the anti-reflection films of [Example A2] to [Example 11] were prepared.

Example A12 to Example A14

In [Example A12], with the use of the coating liquid for forming a localized layer A1, the localized layer was formed at the primary drying temperature of 50° C. and at the secondary drying temperature of 60° C., and with the other production conditions being the same as those in [Example A1], the anti-reflection film of [Example A12] was prepared.

In [Example A13], with the use of the coating liquid for forming a localized layer A1, the localized layer was formed at both the primary drying temperature and the secondary drying temperature of 25° C., and with the other production conditions being the same as those in [Example A1], the anti-reflection film of [Example A13] was prepared.

In [Example A14], with the use of the coating liquid for forming a localized layer A1, the localized layer was formed at both the primary drying temperature and the secondary drying temperature of 80° C., and with the other production conditions being the same as those in [Example A1], the anti-reflection film of [Example A14] was prepared.

Example A15 and Example A16

In [Example A15] and [Example A16], with the use of the coating liquids for forming a localized layer A12 and A13 instead of the coating liquid for forming a localized layer A1, and with the other production conditions being the same as those in [Example A1], the anti-reflection films of [Example A15] and [Example A16] were prepared.

The production conditions in [Example A1] to [Example A16] are described collectively in Table 1.

TABLE 1

| | | Production Condition | | | | | | | |
|---|---|---|---|---|---|---|---|---|---|
| | | | | | | | Solvent | Drying Temperature | |
| | | Quaternary Ammonium Salt Material | | | Leveling Material | | | Solid Content | Primary Drying | Secondary Drying |
| | Coating Liquid for Forming | Name of Material | Molecular Weight | Amount | Name of Material | Name of Material | Adjustment | Temperature | Temperature |
| Example A1 | Localized Layer-Forming Coating Liquid A1 | Synthesis Example 1 | 18500 | 10 Part by Weight | F470 | Methyl Ethyl Ketone | 50% | 25° C. | 80° C. |
| Example A2 | Localized Layer-Forming Coating Liquid A2 | NR-121X-9IPA | 15000 | 20 Part by Weight | F470 | Methyl Ethyl Ketone | 50% | 25° C. | 80° C. |
| Example A3 | Localized Layer-Forming Coating Liquid A3 | Synthesis Example 1 | 18500 | 10 Part by Weight | F489 | Methyl Ethyl Ketone | 50% | 25° C. | 80° C. |
| Example A4 | Localized Layer-Forming Coating Liquid A4 | Synthesis Example 1 | 18500 | 10 Part by Weight | FETERGENT 222F | Methyl Ethyl Ketone | 50% | 25° C. | 80° C. |
| Example A5 | Localized Layer-Forming Coating Liquid A5 | LIGHT ESTER DQ100 | 208 | 10 Part by Weight | F470 | Methyl Ethyl Ketone | 50% | 25° C. | 80° C. |
| Example A6 | Localized Layer-Forming Coating Liquid A6 | Ammonium Salt Homopolymer | 120000 | 10 Part by Weight | F470 | Methyl Ethyl Ketone | 50% | 25° C. | 80° C. |
| Example A7 | Localized Layer-Forming Coating Liquid A7 | Synthesis Example 1 | 18500 | 0.01 Part by Weight | F470 | Methyl Ethyl Ketone | 50% | 25° C. | 80° C. |
| Example A8 | Localized Layer-Forming Coating Liquid A8 | Synthesis Example 1 | 18500 | 100 Part by Weight | F470 | Methyl Ethyl Ketone | 50% | 25° C. | 80° C. |
| Example A9 | Localized Layer-Forming Coating Liquid A9 | Synthesis Example 1 | 18500 | 10 Part by Weight | F470 | Isopropyl Alcohol | 50% | 25° C. | 80° C. |
| Example A10 | Localized Layer-Forming Coating Liquid A10 | Synthesis Example 1 | 18500 | 10 Part by Weight | F470 | Methyl Ethyl Ketone | 20% | 25° C. | 80° C. |

TABLE 1-continued

| | | Quaternary Ammonium Salt Material | | | Leveling Material | Solvent | Solid Content Adjustment | Drying Temperature | |
|---|---|---|---|---|---|---|---|---|---|
| | Coating Liquid for Forming | Name of Material | Molecular Weight | Amount | Name of Material | Name of Material | | Primary Drying Temperature | Secondary Drying Temperature |
| Example A11 | Localized Layer-Forming Coating Liquid A11 | Synthesis Example 1 | 18500 | 10 Part by Weight | F470 | Methyl Ethyl Ketone | 90% | 25° C. | 80° C. |
| Example A12 | Localized Layer-Forming Coating Liquid A1 | Synthesis Example 1 | 18500 | 10 Part by Weight | F470 | Methyl Ethyl Ketone | 50% | 50° C. | 60° C. |
| Example A13 | Localized Layer-Forming Coating Liquid A1 | Synthesis Example 1 | 18500 | 10 Part by Weight | F470 | Methyl Ethyl Ketone | 50% | 25° C. | |
| Example A14 | Localized Layer-Forming Coating Liquid A1 | Synthesis Example 1 | 18500 | 10 Part by Weight | F470 | Methyl Ethyl Ketone | 50% | 80° C. | |
| Example A15 | Localized Layer-Forming Coating Liquid A12 | Synthesis Example 1 | 18500 | 10 Part by Weight | — | Methyl Ethyl Ketone | 50% | 25° C. | 80° C. |
| Example A16 | Localized Layer-Forming Coating Liquid A13 | — | — | — | — | Methyl Ethyl Ketone | 50% | 25° C. | 80° C. |

As for the obtained anti-reflection films of [Example A1] to [Example A16], evaluations were performed as described above, and the state of formation of each layer in the localized layer was confirmed. The evaluation results and the like are described collectively in Table 2.

| antimony-containing tin oxide (the average particle size of 50 nm/isopropyl alcohol dispersion liquid) (solid content) | 5 parts by weight |
|---|---|

TABLE 2

| | Evaluation Item | | | | | | | | | | | |
|---|---|---|---|---|---|---|---|---|---|---|---|---|
| | Parallel | | | Contact Angle (°) | | Color | | | | State of Localized Layer | | |
| | Luminous | | Light | Surface | Localized | Low-refractive | Irregularity and | Excoriation | Pencil | Formation | | | |
| | Reflectance (%) | Haze (%) | Transmittance (%) | Resistivity (Ω/□) | Layer Surface | Index Surface | Interference Fringes | Resistance (SW) | Hardness | Intermediate Layer | Hard Coat Layer | Antistatic Layer | Leveling Layer |
| Example A1 | 1.0 | 0.1 | 96.0 | 1 × 10⁹ | 75 | 85 | ○ | ○ | 2H | ○ | ○ | ○ | ○ |
| Example A2 | 1.0 | 0.1 | 96.0 | 1 × 10⁹ | 75 | 85 | ○ | ○ | 2H | ○ | ○ | ○ | ○ |
| Example A3 | 1.0 | 0.1 | 96.0 | 1 × 10⁹ | 75 | 85 | ○ | ○ | 2H | ○ | ○ | ○ | ○ |
| Example A4 | 1.0 | 0.1 | 96.0 | 1 × 10⁹ | 75 | 85 | ○ | ○ | 2H | ○ | ○ | ○ | ○ |
| Example A5 | 1.0 | 2.0 | 94.0 | 5 × 10⁸ | 45 | 60 | ○ | X | 2H | ○ | ○ | ○ | X |
| Example A6 | 1.0 | 0.1 | 96.0 | 1 × 10¹³ | 75 | 85 | ○ | ○ | 2H | ○ | ○ | X | ○ |
| Example A7 | 1.0 | 0.1 | 96.0 | 1 × 10¹³ | 75 | 85 | ○ | ○ | 2H | ○ | ○ | X | ○ |
| Example A8 | 1.0 | 5.0 | 92.5 | 2 × 10⁸ | 40 | 60 | ○ | X | 2H | ○ | ○ | ○ | X |
| Example A9 | 1.0 | 0.1 | 96.0 | 1 × 10⁸ | 75 | 85 | X | ○ | 2H | X | ○ | ○ | ○ |
| Example A10 | 1.0 | 3.0 | 94.0 | 1 × 10⁸ | 40 | 60 | ○ | X | B | ○ | X | ○ | X |
| Example A11 | 1.0 | 0.7 | 95.5 | 5 × 10¹³ | 75 | 85 | X | ○ | 2H | X | ○ | X | X |
| Example A12 | 1.0 | 2.0 | 95.0 | 1 × 10¹³ | 60 | 85 | ○ | X | 2H | ○ | ○ | X | X |
| Example A13 | 1.0 | 0.1 | 96.0 | 1 × 10⁹ | 40 | 50 | ○ | X | B | ○ | X | ○ | X |
| Example A14 | 1.0 | 0.1 | 96.0 | 5 × 10¹³ | 60 | 85 | ○ | ○ | 2H | ○ | ○ | X | X |
| Example A15 | 1.0 | 3.0 | 94.0 | 5 × 10⁸ | 40 | 50 | ○ | X | 2H | ○ | ○ | ○ | X |
| Example A16 | 1.0 | 0.1 | 96.0 | 5 × 10¹³ | 70 | 85 | ○ | ○ | 2H | ○ | ○ | X | X |

(B) Leveling Material: Fluorocompound×Conductive Material: Metal Oxide Particle

Hereinafter, Examples in which a fluorocompound is used as a leveling material and a metal oxide particle is used as the conductive material, are described.

Hereinafter, Preparation Examples of the coating liquids for forming a localized layer B1 to B12 are described.

Preparation Example B1

(Coating Fluid for Forming Localized Layer B1)

With respect to 100 parts by weight of urethane acrylate (trade name: UA-306T, manufactured by KYOEISHA CHEMICAL Co., LTD.), a mixture of

| F470 | 0.1 part by weight |
|---|---|
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer B1.

Preparation Example B2

(Coating Fluid for Forming Localized Layer B2)

With respect to 100 parts by weight of urethane acrylate (trade name: UA-306T, manufactured by KYOEISHA CHEMICAL Co., LTD.), a mixture of

| | |
|---|---|
| phosphorus-containing tin oxide (the average particle size of size 50 nm/isopropyl alcohol dispersion liquid) (solid content) | 5 parts by weight |
| F470 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer B2.

Preparation Example B3

(Coating Fluid for Forming Localized Layer B3)

With respect to 100 parts by weight of urethane acrylate (trade name: UA-306T, manufactured by KYOEISHA CHEMICAL Co., LTD.), a mixture of

| | |
|---|---|
| antimony-containing tin oxide (the average particle size of 50 nm/isopropyl alcohol dispersion liquid) (solid content) | 5 parts by weight |
| F489 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer B3.

Preparation Example B4

(Coating Fluid for Forming Localized Layer B4)

With respect to 100 parts by weight of urethane acrylate (trade name: UA-306T, manufactured by KYOEISHA CHEMICAL Co., LTD.), a mixture of

| | |
|---|---|
| antimony-containing tin oxide (the average particle size of 50 nm/isopropyl alcohol dispersion liquid) (solid content) | 5 parts by weight |
| FETERGENT 222F | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer B4.

Preparation Example B5

(Coating Fluid for Forming Localized Layer B5)

With respect to 100 parts by weight of urethane acrylate (trade name: UA-306T, manufactured by KYOEISHA CHEMICAL Co., LTD.), a mixture of

| | |
|---|---|
| antimony-containing tin oxide (the average particle size of 50 nm/isopropyl alcohol dispersion liquid) (solid content) | 0.01 part by weight |
| F470 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer B5.

Preparation Example B6

(Coating Fluid for Forming Localized Layer B6)

With respect to 100 parts by weight of urethane acrylate (trade name: UA-306T, manufactured by KYOEISHA CHEMICAL Co., LTD.), a mixture of

| | |
|---|---|
| antimony-containing tin oxide (the average particle size of 50 nm/isopropyl alcohol dispersion liquid) (solid content) | 100 parts by weight |
| F470 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer B6.

Preparation Example B7

(Coating Fluid for Forming Localized Layer B7)

With respect to 100 parts by weight of urethane acrylate (trade name: UA-306T, manufactured by KYOEISHA CHEMICAL Co., LTD.), a mixture of

| | |
|---|---|
| antimony-containing tin oxide (the average particle size of 1,000 nm/isopropyl alcohol dispersion liquid) (solid content) | 5 parts by weight |
| F470 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer B7.

Preparation Example B8

(Coating Fluid for Forming Localized Layer B8)

With respect to 100 parts by weight of urethane acrylate (trade name: UA-306T, manufactured by KYOEISHA CHEMICAL Co., LTD.), a mixture of

| | |
|---|---|
| antimony-containing tin oxide (the average particle size of 50 nm/isopropyl alcohol dispersion liquid) (solid content) | 5 parts by weight |

-continued

| | |
|---|---|
| F470 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of isopropyl alcohol, the solution was named as coating liquid for forming a localized layer B8.

Preparation Example B9

(Coating Fluid for Forming Localized Layer B9)
With respect to 100 parts by weight of urethane acrylate (trade name: UA-306T, manufactured by KYOEISHA CHEMICAL Co., LTD.), a mixture of

| | |
|---|---|
| antimony-containing tin oxide (the average particle size of 50 nm/isopropyl alcohol dispersion liquid) (solid content) | 5 parts by weight |
| F470 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 20 wt % with the use of methyl ethyl ketone, the solution was named as coating liquid for forming a localized layer B9.

Preparation Example B10

(Coating Fluid for Forming Localized Layer B10)
With respect to 100 parts by weight of urethane acrylate (trade name: UA-306T, manufactured by KYOEISHA CHEMICAL Co., LTD.), a mixture of

| | |
|---|---|
| antimony-containing tin oxide (the average particle size of 50 nm/isopropyl alcohol dispersion liquid) (solid content) | 5 parts by weight |
| F470 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 90 wt % with the use of methyl ethyl ketone, the solution was named as coating liquid for forming a localized layer B10.

Preparation Example B11

(Coating Fluid for Forming Localized Layer B11)
With respect to 100 parts by weight of urethane acrylate (trade name: UA-306T, manufactured by KYOEISHA CHEMICAL Co., LTD.), a mixture of

| | |
|---|---|
| antimony-containing tin oxide (the average particle size of 50 nm/isopropyl alcohol dispersion liquid) (solid content) | 5 parts by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer B11.

Preparation Example B12

(Coating Fluid for Forming Localized Layer B12)
With respect to 100 parts by weight of urethane acrylate (trade name: UA-306T, manufactured by KYOEISHA CHEMICAL Co., LTD.), a mixture of

| | |
|---|---|
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer B12.

Hereinafter, Preparation Examples of the coating liquid for forming a low refractive index layer B are described.
(Coating Fluid for Forming Low Refractive Index Layer B)
A mixture of

| | |
|---|---|
| dispersion liquid of porous silica fine particles (the average particle size of 50 nm/the solid content of 20 wt %/methyl isobutyl ketone dispersion liquid) (solid content) | 2.5 parts by weight |
| EO-modified dipentaerythritol hexaacrylate (trade name: DPEA-12, manufactured by NIPPO KAYAKU Co., Ltd.) | 2.5 parts by weight |
| photoinitiator (trade name: IRGACURE 184, manufactured by Ciba Japan K.K.) | 0.1 part by weight | were prepared, and then the mixture was adjusted so as to be a solution with the solid content of 5 wt % with the use of isopropyl alcohol, the solution was named as coating liquid for forming a low refractive index layer B.

Example B1

(Formation of Localized Layer)
Onto one surface of a triacetyl cellulose film (manufactured by FUJIFILM Corporation, the film thickness of 80 μm), the coating liquid for forming a localized layer B1 was applied. The applied surface was dried at 25° C. for 10 seconds in a drying oven as primary drying, continuously at 80° C. for 50 seconds in a drying oven as secondary drying, and then irradiated with ultraviolet light with the use of an ultraviolet irradiation apparatus (manufactured by Fusion UV Systems Japan KK., light source: H bulb) at an irradiation dose of 300 mJ/m$^2$, thereby to form a transparent localized layer with the dry film thickness of 5 μm.
(Formation of Low Refractive Index Layer)
Onto the localized layer formed above, the coating liquid for forming a low refractive index layer B was applied so that the film thickness after the drying became 100 nm. The applied surface was dried at the primary drying temperature of 25° C. for 25 seconds and then at the secondary drying temperature of 80° C. for 50 seconds, and then irradiated with ultraviolet light with the use of an ultraviolet irradiation apparatus (manufactured by Fusion UV Systems Japan KK., light source: H bulb) at an irradiation dose of 192 mJ/m² to cure the film, thereby to form a low refractive index layer, and the anti-reflection film of [Example B1] was prepared.

Example B2 to Example B10

In [Example B2] to [Example B10], with the use of the coating liquids for forming a localized layer B2 to B10 instead of the coating liquid for forming a localized layer B1, and with the other production conditions being the same as those in [Example B1], the anti-reflection films of [Example B2] to [Example B10] were prepared.

Example B11 to Example B13

In [Example B11], with the use of the coating liquid for forming a localized layer B1, the localized layer was formed at the primary drying temperature of 50° C. and at the secondary drying temperature of 60° C., and with the other production conditions being the same as those in [Example B1], the anti-reflection film of [Example B11] was prepared.

In [Example B12], with the use of the coating liquid for forming a localized layer B1, the localized layer was formed at both the primary drying temperature and the secondary drying temperature of 25° C., and with the other production conditions being the same as those in [Example B1], the anti-reflection film of [Example B12] was prepared.

In [Example B13], with the use of the coating liquid for forming a localized layer B1, the localized layer was formed at both the primary drying temperature and the secondary drying temperature of 80° C., and with the other production conditions being the same as those in [Example B1], the anti-reflection film of [Example B13] was prepared.

Example B14 and Example B15

In [Example B14] and [Example B15], with the use of the coating liquids for forming a localized layer B11 and B12 instead of the coating liquid for forming a localized layer B1, and with the other production conditions being the same as those in [Example B1], the anti-reflection films of [Example B14] and [Example B15] were prepared.

The production conditions in [Example B1] to [Example B15] are described collectively in Table 3.

TABLE 3

| | | Production Condition | | | | | | | |
|---|---|---|---|---|---|---|---|---|---|
| | | Metal Oxide Particle | | | | Solvent | | Drying Temperature | |
| | Coating Liquid for Forming | Name of Material | Average Particle Size (nm) | Amount | Leveling Material Name of Material | Name of Material | Solid Content Adjustment | Primary Drying Temperature | Secondary Drying Temperature |
| Example B1 | Localized Layer-Forming Coating Liquid B1 | ATO | 50 | 5 Part by Weight | F470 | Methyl Ethyl Ketone | 50% | 25° C. | 80° C. |
| Example B2 | Localized Layer-Forming Coating Liquid B2 | PTO | 50 | 5 Part by Weight | F470 | Methyl Ethyl Ketone | 50% | 25° C. | 80° C. |
| Example B3 | Localized Layer-Forming Coating Liquid B3 | ATO | 50 | 5 Part by Weight | F489 | Methyl Ethyl Ketone | 50% | 25° C. | 80° C. |
| Example B4 | Localized Layer-Forming Coating Liquid B4 | ATO | 50 | 5 Part by Weight | FETERGENT 222F | Methyl Ethyl Ketone | 50% | 25° C. | 80° C. |
| Example B5 | Localized Layer-Forming Coating Liquid B5 | ATO | 50 | 0.01 Part by Weight | F470 | Methyl Ethyl Ketone | 50% | 25° C. | 80° C. |
| Example B6 | Localized Layer-Forming Coating Liquid B6 | ATO | 50 | 100 Part by Weight | F470 | Methyl Ethyl Ketone | 50% | 25° C. | 80° C. |
| Example B7 | Localized Layer-Forming Coating Liquid B7 | ATO | 1000 | 5 Part by Weight | F470 | Methyl Ethyl Ketone | 50% | 25° C. | 80° C. |
| Example B8 | Localized Layer-Forming Coating Liquid B8 | ATO | 50 | 5 Part by Weight | F470 | Isopropyl Alcohol | 50% | 25° C. | 80° C. |
| Example B9 | Localized Layer-Forming Coating Liquid B9 | ATO | 50 | 5 Part by Weight | F470 | Methyl Ethyl Ketone | 20% | 25° C. | 80° C. |
| Example B10 | Localized Layer-Forming Coating Liquid B10 | ATO | 50 | 5 Part by Weight | F470 | Methyl Ethyl Ketone | 90% | 25° C. | 80° C. |
| Example B11 | Localized Layer-Forming Coating Liquid B1 | ATO | 50 | 5 Part by Weight | F470 | Methyl Ethyl Ketone | 50% | 50° C. | 60 |
| Example B12 | Localized Layer-Forming Coating Liquid B1 | ATO | 50 | 5 Part by Weight | F470 | Methyl Ethyl Ketone | 50% | 25° C. | |
| Example B13 | Localized Layer-Forming Coating Liquid B1 | ATO | 50 | 5 Part by Weight | F470 | Methyl Ethyl Ketone | 50% | 80° C. | |
| Example B14 | Localized Layer-Forming Coating Liquid B11 | ATO | 50 | 5 Part by Weight | — | Methyl Ethyl Ketone | 50% | 25° C. | 80° C. |
| Example B15 | Localized Layer-Forming Coating Liquid B12 | — | — | — | — | Methyl Ethyl Ketone | 50% | 25° C. | 80° C. |

As for the obtained anti-reflection films of [Example B1] to [Example B15], evaluations were performed as described above, and the state of formation of each layer in the localized layer was confirmed. The evaluation results and the like are described collectively in Table 4.

TABLE 4

| | Evaluation Item | | | | | | | | | | | |
|---|---|---|---|---|---|---|---|---|---|---|---|---|
| | Parallel | | | Contact Angle (°) | | Color | | | | State of Localized Layer | | |
| | | | | | | | | | | Formation | | |
| | Luminous Reflectance (%) | Haze (%) | Light Transmittance (%) | Surface Resistivity (Ω/□) | Localized Layer Surface | Low-refractive Index Surface | Irregularity and Interference Fringes | Excoriation Resistance (SW) | Pencil Hardness | Intermediate Layer | Hard Coat Layer | Antistatic Layer | Leveling Layer |
| Example B1 | 1.0 | 0.1 | 95.0 | $1 \times 10^9$ | 75 | 85 | ○ | ○ | 2H | ○ | ○ | ○ | ○ |
| Example B2 | 1.0 | 0.1 | 95.0 | $1 \times 10^9$ | 75 | 85 | ○ | ○ | 2H | ○ | ○ | ○ | ○ |
| Example B3 | 1.0 | 0.1 | 95.0 | $1 \times 10^9$ | 75 | 85 | ○ | ○ | 2H | ○ | ○ | ○ | ○ |
| Example B4 | 1.0 | 0.1 | 95.0 | $1 \times 10^9$ | 75 | 85 | ○ | ○ | 2H | ○ | ○ | ○ | ○ |
| Example B5 | 1.0 | 0.1 | 95.0 | $1 \times 10^{13}$ | 75 | 85 | ○ | ○ | 2H | ○ | ○ | X | ○ |
| Example B6 | 1.0 | 5.0 | 95.5 | $2 \times 10^8$ | 40 | 60 | ○ | X | 2H | ○ | ○ | ○ | X |
| Example B7 | 1.0 | 3/0 | 93.5 | $1 \times 10^9$ | 50 | 50 | ○ | X | 2H | ○ | ○ | ○ | X |
| Example B8 | 1.0 | 0.1 | 95.0 | $1 \times 10^8$ | 75 | 85 | X | ○ | 2H | X | ○ | ○ | ○ |
| Example B9 | 1.0 | 3.0 | 92.0 | $1 \times 10^8$ | 40 | 60 | ○ | X | B | ○ | X | ○ | X |
| Example B10 | 1.0 | 3.0 | 92.0 | $5 \times 10^{13}$ | 75 | 85 | X | ○ | 2H | X | ○ | X | X |
| Example B11 | 1.0 | 2.0 | 93.0 | $1 \times 10^{13}$ | 60 | 85 | ○ | X | 2H | ○ | ○ | X | X |
| Example B12 | 1.0 | 0.1 | 95.0 | $1 \times 10^9$ | 40 | 50 | ○ | X | B | ○ | X | ○ | X |
| Example B13 | 1.0 | 0.1 | 95.0 | $5 \times 10^{13}$ | 60 | 85 | ○ | ○ | 2H | ○ | ○ | X | X |
| Example B14 | 1.0 | 5.0 | 93.0 | $5 \times 10^8$ | 40 | 50 | ○ | X | 2H | ○ | ○ | ○ | X |
| Example B15 | 1.0 | 0.1 | 96.0 | $5 \times 10^{13}$ | 70 | 85 | ○ | ○ | 2H | ○ | ○ | X | X |

(C) Leveling Material: Fluorocompound×Conductive Material: a Conductive Polymer

Hereinafter, Examples in which a fluorocompound is used as a leveling material and a conductive polymer is used as a conductive material, are described.

Hereinafter, Preparation Examples of the coating liquids for forming a localized layer C1 to C10 are described.

Preparation Example C1

(Coating fluid for forming localized layer C1)

With respect to 100 parts by weight of urethane acrylate (trade name: UA-306T, manufactured by KYOEISHA CHEMICAL Co., LTD.), a mixture of

| | |
|---|---|
| polythiophene (the average particle size of 100 nm/isopropyl alcohol dispersion liquid) (solid content) | 5 parts by weight |
| F470 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer C1.

Preparation Example C2

(Coating Fluid for Forming Localized Layer C2)

With respect to 100 parts by weight of urethane acrylate (trade name: UA-306T, manufactured by KYOEISHA CHEMICAL Co., LTD.), a mixture of

| | |
|---|---|
| polythiophene (the average particle size of 300 nm/isopropyl alcohol dispersion liquid) (solid content) | 5 parts by weight |
| F470 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer C2.

Preparation Example C3

(Coating Fluid for Forming Localized Layer C3)

With respect to 100 parts by weight of urethane acrylate (trade name: UA-306T, manufactured by KYOEISHA CHEMICAL Co., LTD.), a mixture of

| | |
|---|---|
| polythiophene (the average particle size of 100 nm/isopropyl alcohol dispersion liquid) (solid content) | 5 parts by weight |
| F489 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer C3.

Preparation Example C4

(Coating Fluid for Forming Localized Layer C4)
With respect to 100 parts by weight of urethane acrylate (trade name: UA-306T, manufactured by KYOEISHA CHEMICAL Co., LTD.), a mixture of

| | |
|---|---|
| polythiophene (the average particle size of 100 nm/isopropyl alcohol dispersion liquid) (solid content) | 5 parts by weight |
| FETERGENT 222F | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer C4.

Preparation Example C5

(Coating Fluid for Forming Localized Layer C5)
With respect to 100 parts by weight of urethane acrylate (trade name: UA-306T, manufactured by KYOEISHA CHEMICAL Co., LTD.), a mixture of

| | |
|---|---|
| polythiophene (the average particle size of 100 nm/isopropyl alcohol dispersion liquid) (solid content) | 0.01 part by weight |
| F470 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer C5.

Preparation Example C6

(Coating Fluid for Forming Localized Layer C6)
With respect to 100 parts by weight of urethane acrylate (trade name: UA-306T, manufactured by KYOEISHA CHEMICAL Co., LTD.), a mixture of

| | |
|---|---|
| polythiophene (the average particle size of 100 nm/isopropyl alcohol dispersion liquid) (solid content) | 5 parts by weight |
| F470 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of isopropyl alcohol, the solution was named as coating liquid for forming a localized layer C6.

Preparation Example C7

(Coating Fluid for Forming Localized Layer C7)
With respect to 100 parts by weight of urethane acrylate (trade name: UA-306T, manufactured by KYOEISHA CHEMICAL Co., LTD.), a mixture of

| | |
|---|---|
| polythiophene (the average particle size of 100 nm/isopropyl alcohol dispersion liquid) (solid content) | 5 parts by weight |
| F470 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 20 wt % with the use of methyl ethyl ketone, the solution was named as coating liquid for forming a localized layer C7.

Preparation Example C8

(Coating Fluid for Forming Localized Layer C8)
With respect to 100 parts by weight of urethane acrylate (trade name: UA-306T, manufactured by KYOEISHA CHEMICAL Co., LTD.), a mixture of

| | |
|---|---|
| polythiophene (the average particle size of 100 nm/isopropyl alcohol dispersion liquid) (solid content) | 5 parts by weight |
| F470 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 90 wt % with the use of methyl ethyl ketone, the solution was named as coating liquid for forming a localized layer C8.

Preparation Example C9

(Coating Fluid for Forming Localized Layer C9)
With respect to 100 parts by weight of urethane acrylate (trade name: UA-306T, manufactured by KYOEISHA CHEMICAL Co., LTD.), a mixture of

| | |
|---|---|
| polythiophene (the average particle size of 100 nm/isopropyl alcohol dispersion liquid) (solid content) | 5 parts by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer C9.

Preparation Example C10

(Coating Fluid for Forming Localized Layer C10)
With respect to 100 parts by weight of urethane acrylate (trade name: UA-306T, manufactured by KYOEISHA CHEMICAL Co., LTD.), a mixture of

| | |
|---|---|
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer C10.

Hereinafter, Preparation Examples of the coating liquid for forming a low refractive index layer C are described.
(Coating Fluid for Forming Low Refractive Index Layer C)
A mixture of

| | |
|---|---|
| dispersion liquid of porous silica fine particles (the average particle size of 50 nm/the solid content of 20 wt %/ methyl isobutyl ketone dispersion liquid) (solid content) | 2.5 parts by weight |
| EO-modified dipentaerythritol hexaacrylate (trade name: DPEA-12, manufactured by NIPPO KAYAKU Co., Ltd.) | 2.5 parts by weight |
| photoinitiator (trade name: IRGACURE 184, manufactured by Ciba Japan K.K.) | 0.1 part by weight | was prepared, and then the mixture was adjusted so as to be a solution with the solid content of 5 wt % with the use of isopropyl alcohol, the solution was named as coating liquid for forming a low refractive index layer C.

Example C1

(Formation of Localized Layer)

Onto one surface of a triacetyl cellulose film (manufactured by FUJIFILM Corporation, the film thickness of 80 μm), the coating liquid for forming a localized layer C1 was applied. The applied surface was dried at 25° C. for 10 seconds in a drying oven as primary drying, continuously at 80° C. for 50 seconds in a drying oven as secondary drying, and then irradiated with ultraviolet light with the use of an ultraviolet irradiation apparatus (manufactured by Fusion UV Systems Japan KK., light source: H bulb) at an irradiation dose of 300 mJ/m$^2$, thereby to form a transparent localized layer with the dry film thickness of 5 μm.
(Formation of Low Refractive Index Layer)

Onto the localized layer formed above, the coating liquid for forming a low refractive index layer C was applied so that the film thickness after the drying became 100 nm. The applied surface was dried at the primary drying temperature of 25° C. for 25 seconds and then at the secondary drying temperature of 80° C. for 50 seconds, and then irradiated with ultraviolet light with the use of an ultraviolet irradiation apparatus (manufactured by Fusion UV Systems Japan KK., light source: H bulb) at an irradiation dose of 192 mJ/m$^2$ to cure the film, thereby to form a low refractive index layer, and the anti-reflection film of [Example C1] was prepared.

Example C2 to Example C8

In [Example C2] to [Example C8], with the use of the coating liquids for forming a localized layer C2 to C8 instead of the coating liquid for forming a localized layer C1, and with the other production conditions being the same as those in [Example C1], the anti-reflection films of [Example C2] to [Example C8] were prepared.

Example C9 to Example C11

In [Example C9], with the use of the coating liquid for forming a localized layer C1, the localized layer was formed at the primary drying temperature of 50° C. and at the secondary drying temperature of 60° C., and with the other production conditions being the same as those in [Example C1], the anti-reflection film of [Example C9] was prepared.

In [Example C10], with the use of the coating liquid for forming a localized layer C1, the localized layer was formed at both the primary drying temperature and the secondary drying temperature of 25° C., and with the other production conditions being the same as those in [Example C1], the anti-reflection film of [Example C10] was prepared.

In [Example C11], with the use of the coating liquid for forming a localized layer C1, the localized layer was formed at both the primary drying temperature and the secondary drying temperature of 80° C., and with the other production conditions being the same as those in [Example C1], the anti-reflection film of [Example C11] was prepared.

Example C12 and Example C13

In [Example C12] and [Example C13], with the use of the coating liquids for forming a localized layer C9 and C10 instead of the coating liquid for forming a localized layer C1, and with the other production conditions being the same as those in [Example C1], the anti-reflection films of [Example C12] and [Example C13] were prepared.

The production conditions in [Example C1] to [Example C13] are described collectively in Table 5.

TABLE 5

| | Production Condition | | | | | | | |
|---|---|---|---|---|---|---|---|---|
| | | Conductive Polymer | | | | Solvent | Drying Temperature | |
| | Coating Liquid for Forming | Name of Material | Average Particle Size (nm) | Amount | Leveling Material Name of Material | Name of Material | Solid Content Adjustment | Primary Drying Temperature | Secondary Drying Temperature |
| Example C1 | Localized Layer-Forming Coating Liquid C1 | Polythiophene | 100 | 5 Part by Weight | F470 | Methyl Ethyl Ketone | 50% | 25° C. | 80° C. |
| Example C2 | Localized Layer-Forming Coating Liquid C2 | Polythiophene | 300 | 5 Part by Weight | F470 | Methyl Ethyl Ketone | 50% | 25° C. | 80° C. |
| Example C3 | Localized Layer-Forming Coating Liquid C3 | Polythiophene | 100 | 5 Part by Weight | F489 | Methyl Ethyl Ketone | 50% | 25° C. | 80° C. |
| Example C4 | Localized Layer-Forming Coating Liquid C4 | Polythiophene | 100 | 5 Part by Weight | FETERGENT 222F | Methyl Ethyl Ketone | 50% | 25° C. | 80° C. |
| Example C5 | Localized Layer-Forming Coating Liquid C5 | Polythiophene | 100 | 0.01 Part by Weight | F470 | Isopropyl Alcohol | 50% | 25° C. | 80° C. |
| Example C6 | Localized Layer-Forming Coating Liquid C6 | Polythiophene | 100 | 5 Part by Weight | F470 | Isopropyl Alcohol | 50% | 25° C. | 80° C. |

TABLE 5-continued

| | | Production Condition | | | | | | |
|---|---|---|---|---|---|---|---|---|
| | | Conductive Polymer | | | | Solvent | Drying Temperature | |
| | Coating Liquid for Forming | Name of Material | Average Particle Size (nm) | Amount | Leveling Material Name of Material | Name of Material | Solid Content Adjust- ment | Primary Drying Temper- ature | Secondary Drying Temper- ature |
| Example C7 | Localized Layer-Forming Coating Liquid C7 | Polythiophene | 100 | 5 Part by Weight | F470 | Methyl Ethyl Ketone | 20% | 25° C. | 80° C. |
| Example C8 | Localized Layer-Forming Coating Liquid C8 | Polythiophene | 100 | 5 Part by Weight | F470 | Methyl Ethyl Ketone | 90% | 25° C. | 80° C. |
| Example C9 | Localized Layer-Forming Coating Liquid C1 | Polythiophene | 100 | 5 Part by Weight | F470 | Methyl Ethyl Ketone | 50% | 50° C. | 60° C. |
| Example C10 | Localized Layer-Forming Coating Liquid C1 | Polythiophene | 100 | 5 Part by Weight | F470 | Methyl Ethyl Ketone | 50% | 25° C. | |
| Example C11 | Localized Layer-Forming Coating Liquid C1 | Polythiophene | 100 | 5 Part by Weight | F470 | Methyl Ethyl Ketone | 50% | 80° C. | |
| Example C12 | Localized Layer-Forming Coating Liquid C9 | Polythiophene | 100 | 5 Part by Weight | — | Methyl Ethyl Ketone | 50% | 25° C. | 80° C. |
| Example C13 | Localized Layer-Forming Coating Liquid C10 | — | — | — | — | Methyl Ethyl Ketone | 50% | 25° C. | 80° C. |

As for the obtained anti-reflection films of [Example C1] to [Example C13], evaluations were performed as described above, and the state of formation of each layer in the localized layer was confirmed. The evaluation results and the like are described collectively in Table 6.

| octylpolyethylene glycol polypropylene glycol methacrylate (trade name: "BLEMMER 50POEP-800B", manufactured by NOF CORPORATION) | 18.0 g |
|---|---|

TABLE 6

| | Evaluation Item | | | | | | | | | | | | |
|---|---|---|---|---|---|---|---|---|---|---|---|---|---|
| | Parallel | | | Contact Angle (°) | | Color | | | State of Localized Layer | | | | |
| | Luminous Reflec- tance (%) | Haze (%) | Light Transmit- tance (%) | Surface Resis- tivity (Ω/□) | Local- ized Layer Surface | Low- refractive Index Surface | Irregularity and Interference Fringes | Excori- ation Resistance (SW) | Pencil Hard- ness | Formation | | | |
| | | | | | | | | | | Inter- mediate Layer | Hard Coat Layer | Anti- static Layer | Level- ing Layer |
| Example C1 | 1.0 | 0.1 | 95.0 | 1 × 10⁹ | 75 | 85 | ○ | ○ | 2H | ○ | ○ | ○ | ○ |
| Example C2 | 1.0 | 0.1 | 95.0 | 1 × 10⁹ | 75 | 85 | ○ | ○ | 2H | ○ | ○ | ○ | ○ |
| Example C3 | 1.0 | 0.1 | 95.0 | 1 × 10⁹ | 75 | 85 | ○ | ○ | 2H | ○ | ○ | ○ | ○ |
| Example C4 | 1.0 | 0.1 | 95.0 | 1 × 10⁹ | 75 | 85 | ○ | ○ | 2H | ○ | ○ | ○ | ○ |
| Example C5 | 1.0 | 0.1 | 95.5 | 1 × 10¹³ | 75 | 85 | ○ | ○ | 2H | ○ | ○ | X | ○ |
| Example C6 | 1.0 | 0.1 | 95.0 | 1 × 10⁸ | 75 | 85 | X | ○ | 2H | X | ○ | ○ | ○ |
| Example C7 | 1.0 | 3.0 | 93.5 | 1 × 10⁸ | 40 | 60 | ○ | X | B | ○ | X | ○ | X |
| Example C8 | 1.0 | 0.7 | 95.0 | 5 × 10¹³ | 75 | 85 | X | ○ | 2H | X | ○ | X | X |
| Example C9 | 1.0 | 2.0 | 92.0 | 1 × 10¹³ | 60 | 85 | ○ | X | 2H | ○ | ○ | X | X |
| Example C10 | 1.0 | 0.1 | 95.0 | 1 × 10⁹ | 40 | 50 | ○ | X | B | ○ | X | ○ | X |
| Example C11 | 1.0 | 0.1 | 95.0 | 5 × 10¹³ | 60 | 85 | ○ | ○ | 2H | ○ | ○ | X | X |
| Example C12 | 1.0 | 3.0 | 92.0 | 5 × 10⁸ | 40 | 50 | ○ | X | 2H | ○ | ○ | ○ | X |
| Example C13 | 1.0 | 0.1 | 96.0 | 5 × 10¹³ | 70 | 85 | ○ | ○ | 2H | ○ | ○ | X | X |

(D) Leveling Material: Compound which has a Siloxane Bond×Conductive Material: Quaternary Ammonium Salt Material Hereinafter, Examples in which a compound which has a siloxane bond is used as a leveling material, and a quaternary ammonium salt material is used as a conductive material, are described.

Hereinafter, Preparation Examples of the coating liquids for forming a localized layer D1 to D12 are described.

Synthesis Example 1

Into a four-necked flask equipped with stirring blades, a reflux cooling tube, a dry air introduction tube, and a thermometer, -continued

| methacryloyl oxyethyltrimethyl ammonium chloride | 35.0 g |
|---|---|
| cyclohexyl methacrylate | 14.0 g |
| azobisisobutyronitrile | 0.3 g |
| isopropyl alcohol | 100.0 g |
| methyl ethyl ketone | 40.0 g | were charged, and the mixture in the flask was polymerized at 65° C. for 3 hours under a nitrogen atmosphere. After the completion of the polymerization, the reaction mixture was put into hexane, and a product was precipitated, and then the product was dried. The weight average molecular weight of the obtained quaternary ammonium salt material was 18,500.

Preparation Example D1

(Coating Fluid for Forming Localized Layer D1)

With respect to 100 parts by weight of urethane acrylate (trade name: UA-306T, manufactured by KYOEISHA CHEMICAL Co., LTD.), a mixture of

| | |
|---|---|
| quaternary ammonium salt material produced in Synthesis Example 1 (molecular weight of 18,500) | 10 parts by weight |
| BYK-330 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer D1.

Preparation Example D2

(Coating Fluid for Forming Localized Layer D2)

With respect to 100 parts by weight of urethane acrylate (trade name: UA-306T, manufactured by KYOEISHA CHEMICAL Co., LTD.), a mixture of

| | |
|---|---|
| NR-121X-9IPA | 20 parts by weight |
| BYK-330 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer D2.

Preparation Example D3

(Coating Fluid for Forming Localized Layer D3)

With respect to 100 parts by weight of urethane acrylate (trade name: UA-306T, manufactured by KYOEISHA CHEMICAL Co., LTD.), a mixture of

| | |
|---|---|
| quaternary ammonium salt material produced in Synthesis Example 1 (molecular weight of 18,500) | 10 parts by weight |
| BYK-Silclean3700 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer D3.

Preparation Example D4

(Coating Fluid for Forming Localized Layer D4)

With respect to 100 parts by weight of urethane acrylate (trade name: UA-306T, manufactured by KYOEISHA CHEMICAL Co., LTD.), a mixture of

| | |
|---|---|
| LIGHT ESTER DQ100 (molecular weight of 208) | 10 parts by weight |
| BYK-330 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer D4.

Preparation Example D5

(Coating Fluid for Forming Localized Layer D5)

With respect to 100 parts by weight of urethane acrylate (trade name: UA-306T, manufactured by KYOEISHA CHEMICAL Co., LTD.), a mixture of

| | |
|---|---|
| p-styrene sulfonic acid ammonium salt homopolymer (molecular weight of 120,000) | 10 parts by weight |
| BYK-330 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer D5.

Preparation Example D6

(Coating Fluid for Forming Localized Layer D6)

With respect to 100 parts by weight of urethane acrylate (trade name: UA-306T, manufactured by KYOEISHA CHEMICAL Co., LTD.), a mixture of

| | |
|---|---|
| quaternary ammonium salt material produced in Synthesis Example 1 (molecular weight of 18,500) | 0.01 part by weight |
| BYK-330 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer D6.

Preparation Example D7

(Coating Fluid for Forming Localized Layer D7)

With respect to 100 parts by weight of urethane acrylate (trade name: UA-306T, manufactured by KYOEISHA CHEMICAL Co., LTD.), a mixture of

| | |
|---|---|
| quaternary ammonium salt material produced in Synthesis Example 1 (molecular weight of 18,500) | 100 parts by weight |
| BYK-330 | 0.1 part by weight |
| dipentaerythritol triacrylate | 50 parts by weight |
| pentaerythritol tetraacrylate | 50 parts by weight |

-continued

| | |
|---|---|
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer D7.

Preparation Example D8

(Coating Fluid for Forming Localized Layer D8)
With respect to 100 parts by weight of urethane acrylate (trade name: UA-306T, manufactured by KYOEISHA CHEMICAL Co., LTD.), a mixture of

| | |
|---|---|
| quaternary ammonium salt material produced in Synthesis Example 1 (molecular weight of 18,500) | 10 parts by weight |
| BYK-330 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of isopropyl alcohol, the solution was named as coating liquid for forming a localized layer D8.

Preparation Example D9

(Coating Fluid for Forming Localized Layer D9)
With respect to 100 parts by weight of urethane acrylate (trade name: UA-306T, manufactured by KYOEISHA CHEMICAL Co., LTD.), a mixture of

| | |
|---|---|
| quaternary ammonium salt material produced in Synthesis Example 1 (molecular weight of 18,500) | 10 parts by weight |
| BYK-330 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 20 wt % with the use of methyl ethyl ketone, the solution was named as coating liquid for forming a localized layer D9.

Preparation Example D10

(Coating fluid for forming localized layer D10)
With respect to 100 parts by weight of urethane acrylate (trade name: UA-306T, manufactured by KYOEISHA CHEMICAL Co., LTD.), a mixture of

| | |
|---|---|
| quaternary ammonium salt material produced in Synthesis Example 1 (molecular weight of 18,500) | 10 parts by weight |
| BYK-330 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 90 wt % with the use of methyl ethyl ketone, the solution was named as coating liquid for forming a localized layer D10.

Preparation Example D11

(Coating Fluid for Forming Localized Layer D11)
With respect to 100 parts by weight of urethane acrylate (trade name: UA-306T, manufactured by KYOEISHA CHEMICAL Co., LTD.), a mixture of

| | |
|---|---|
| quaternary ammonium salt material produced in Synthesis Example 1 (molecular weight of 18,500) | 10 parts by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer D11.

Preparation Example D12

(Coating Fluid for Forming Localized Layer D12)
With respect to 100 parts by weight of urethane acrylate (trade name: UA-306T, manufactured by KYOEISHA CHEMICAL Co., LTD.), a mixture of

| | |
|---|---|
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer D12.

Hereinafter, Preparation Examples of the coating liquid for forming a low refractive index layer D are described.
(Coating fluid for forming low refractive index layer D)
A mixture of

| | |
|---|---|
| dispersion liquid of porous silica fine particles (the average particle size of 50 nm/the solid content of 20 wt %/methyl isobutyl ketone dispersion liquid) (solid content) | 2.5 parts by weight |
| EO-modified dipentaerythritol hexaacrylate (trade name: DPEA-12, manufactured by NIPPO KAYAKU Co., Ltd.) | 2.5 parts by weight |
| photoinitiator (trade name: IRGACURE 184, manufactured by Ciba Japan K.K.) | 0.1 part by weight | was prepared, and then the mixture was adjusted so as to be a solution with the solid content of 5 wt % with the use of isopropyl alcohol, the solution was named as coating liquid for forming a low refractive index layer D.

Example D1

(Formation of Localized Layer)
Onto one surface of a triacetyl cellulose film (manufactured by FUJIFILM Corporation, the film thickness of 80 μm), the coating liquid for forming a localized layer D1 was applied. The applied surface was dried at 25° C. for 10 seconds in a drying oven as primary drying, continuously at 80° C. for 50 seconds in a drying oven as secondary drying, and then irradiated with ultraviolet light with the use of an ultraviolet irradiation apparatus (manufactured by Fusion UV Systems Japan KK., light source: H bulb) at an irradiation dose of 300 mJ/m², thereby to form a transparent localized layer with the dry film thickness of 5 μm.

(Formation Of Low Refractive Index Layer)

Onto the localized layer formed above, the coating liquid for forming a low refractive index layer D was applied so that the film thickness after the drying became 100 nm. The applied surface was dried at the primary drying temperature of 25° C. for 25 seconds and then at the secondary drying temperature of 80° C. for 50 seconds, and then irradiated with ultraviolet light with the use of an ultraviolet irradiation apparatus (manufactured by Fusion UV Systems Japan KK., light source: H bulb) at an irradiation dose of 192 mJ/m² to cure the film, thereby to form a low refractive index layer, and the anti-reflection film of [Example D1] was prepared.

Example D2 to Example D10

In [Example D2] to [Example D10], with the use of the coating liquids for forming a localized layer D2 to D10 instead of the coating liquid for forming a localized layer D1, with the other production conditions being the same as those in [Example D1], the anti-reflection films of [Example D2] to [Example D10] were prepared.

Example D11 to Example D13

In [Example D11], with the use of the coating liquid for forming a localized layer D1, the localized layer was formed at the primary drying temperature of 50° C. and at the secondary drying temperature of 60° C., and with the other production conditions being the same as those in [Example D1], the anti-reflection film of [Example D11] was prepared.

In [Example D12], with the use of the coating liquid for forming a localized layer D1, the localized layer was formed at both the primary drying temperature and the secondary drying temperature of 25° C., and with the other production conditions being the same as those in [Example A1], the anti-reflection film of [Example D12] was prepared.

In [Example D13], with the use of the coating liquid for forming a localized layer D1, the localized layer was formed at both the primary drying temperature and the secondary drying temperature of 80° C., and with the other production conditions being the same as those in [Example D1], the anti-reflection film of [Example D13] was prepared.

Example D14 and Example D15

In [Example D14] and [Example D15], with the use of the coating liquids for forming a localized layer D11 and D12 instead of the coating liquid for forming a localized layer D1, with the other production conditions being the same as those in [Example D1], the anti-reflection films of [Example D14] and [Example D15] were prepared.

The production conditions in [Example D1] to [Example D15] are described collectively in Table 7.

TABLE 7

| | | Production Condition | | | | | | | |
|---|---|---|---|---|---|---|---|---|---|
| | | Quaternary Ammonium Salt Material | | | Leveling Material | Solvent | | Drying Temperature | |
| | Coating Liquid for Forming | Name of Material | Molecular Weight | Amount | Name of Material | Name of Material | Solid Content Adjustment | Primary Drying Temperature | Secondary Drying Temperature |
| Example D1 | Localized Layer-Forming Coating Liquid D1 | Synthesis Example 1 | 18500 | 10 Part by Weight | BYK-330 | Methyl Ethyl Ketone | 50% | 25° C. | 80° C. |
| Example D2 | Localized Layer-Forming Coating Liquid D2 | NR-121X-9IPA | 15000 | 20 Part by Weight | BYK-330 | Methyl Ethyl Ketone | 50% | 25° C. | 80° C. |
| Example D3 | Localized Layer-Forming Coating Liquid D3 | Synthesis Example 1 | 18500 | 10 Part by Weight | BYK-Silclean 3700 | Methyl Ethyl Ketone | 50% | 25° C. | 80° C. |
| Example D4 | Localized Layer-Forming Coating Liquid D4 | LIGHT ESTER DQ100 | 208 | 10 Part by Weight | BYK-330 | Methyl Ethyl Ketone | 50% | 25° C. | 80° C. |
| Example D5 | Localized Layer-Forming Coating Liquid D5 | Ammonium Salt Homopolymer | 120000 | 10 Part by Weight | BYK-330 | Methyl Ethyl Ketone | 50% | 25° C. | 80° C. |
| Example D6 | Localized Layer-Forming Coating Liquid D6 | Synthesis Example 1 | 18500 | 0.01 Part by Weight | BYK-330 | Methyl Ethyl Ketone | 50% | 25° C. | 80° C. |
| Example D7 | Localized Layer-Forming Coating Liquid D7 | Synthesis Example 1 | 18500 | 100 Part by Weight | BYK-330 | Methyl Ethyl Ketone | 50% | 25° C. | 80° C. |
| Example D8 | Localized Layer-Forming Coating Liquid D8 | Synthesis Example 1 | 18500 | 10 Part by Weight | BYK-330 | Isopropyl Alcohol | 50% | 25° C. | 80° C. |
| Example D9 | Localized Layer-Forming Coating Liquid D9 | Synthesis Example 1 | 18500 | 10 Part by Weight | BYK-330 | Methyl Ethyl Ketone | 20% | 25° C. | 80° C. |
| Example D10 | Localized Layer-Forming Coating Liquid D10 | Synthesis Example 1 | 18500 | 10 Part by Weight | BYK-330 | Methyl Ethyl Ketone | 90% | 25° C. | 80° C. |
| Example D11 | Localized Layer-Forming Coating Liquid D1 | Synthesis Example 1 | 18500 | 10 Part by Weight | BYK-330 | Methyl Ethyl Ketone | 50% | 50° C. | 60° C. |
| Example D12 | Localized Layer-Forming Coating Liquid D1 | Synthesis Example 1 | 18500 | 10 Part by Weight | BYK-330 | Methyl Ethyl Ketone | 50% | 25° C. | |
| Example D13 | Localized Layer-Forming Coating Liquid D1 | Synthesis Example 1 | 18500 | 10 Part by Weight | BYK-330 | Methyl Ethyl Ketone | 50% | 80° C. | |
| Example D14 | Localized Layer-Forming Coating Liquid D11 | Synthesis Example 1 | 18500 | 10 Part by Weight | — | Methyl Ethyl Ketone | 50% | 25° C. | 80° C. |
| Example D15 | Localized Layer-Forming Coating Liquid D12 | — | — | — | — | Methyl Ethyl Ketone | 50% | 25° C. | 80° C. |

As for the obtained anti-reflection films of [Example D1] to [Example D15], evaluations were performed as described above, and the state of formation of each layer in the localized layer was confirmed. The evaluation results and the like are described collectively in Table 8.

TABLE 8

| | Evaluation Item | | | | | | | | | | | |
|---|---|---|---|---|---|---|---|---|---|---|---|---|
| | Parallel | | | Contact Angle (°) | | Color | | | State of Localized Layer | | | |
| | | | | | | | | | Formation | | | |
| | Luminous Reflectance (%) | Haze (%) | Light Transmittance (%) | Surface Resistivity (Ω/□) | Localized Layer Surface | Low-refractive Index Surface | Irregularity and Interference Fringes | Excoriation Resistance (SW) | Pencil Hardness | Intermediate Layer | Hard Coat Layer | Antistatic Layer | Leveling Layer |
| Example D1 | 1.0 | 0.1 | 96.0 | $1 \times 10^9$ | 75 | 85 | ○ | ○ | 2H | ○ | ○ | ○ | ○ |
| Example D2 | 1.0 | 0.1 | 96.0 | $1 \times 10^9$ | 75 | 85 | ○ | ○ | 2H | ○ | ○ | ○ | ○ |
| Example D3 | 1.0 | 0.1 | 96.0 | $1 \times 10^9$ | 75 | 85 | ○ | ○ | 2H | ○ | ○ | ○ | ○ |
| Example D4 | 1.0 | 2.0 | 94.0 | $5 \times 10^8$ | 45 | 60 | ○ | X | 2H | ○ | ○ | ○ | X |
| Example D5 | 1.0 | 0.1 | 96.0 | $1 \times 10^{13}$ | 75 | 85 | ○ | ○ | 2H | ○ | ○ | X | ○ |
| Example D6 | 1.0 | 0.1 | 96.0 | $1 \times 10^{13}$ | 75 | 85 | ○ | ○ | 2H | ○ | ○ | X | ○ |
| Example D7 | 1.0 | 3.0 | 93.0 | $2 \times 10^8$ | 40 | 60 | ○ | X | 2H | ○ | ○ | ○ | X |
| Example D8 | 1.0 | 0.1 | 96.0 | $1 \times 10^8$ | 75 | 85 | X | ○ | 2H | X | ○ | ○ | ○ |
| Example D9 | 1.0 | 3.0 | 94.0 | $1 \times 10^8$ | 40 | 60 | ○ | X | B | ○ | X | ○ | X |
| Example D10 | 1.0 | 0.7 | 95.5 | $5 \times 10^{13}$ | 75 | 85 | X | ○ | 2H | X | ○ | X | X |
| Example D11 | 1.0 | 2.0 | 95.0 | $1 \times 10^{13}$ | 60 | 85 | ○ | X | 2H | ○ | ○ | X | X |
| Example D12 | 1.0 | 0.1 | 96.0 | $1 \times 10^9$ | 40 | 50 | ○ | X | B | ○ | X | ○ | X |
| Example D13 | 1.0 | 0.1 | 96.0 | $5 \times 10^{13}$ | 60 | 85 | ○ | ○ | 2H | ○ | ○ | X | X |
| Example D14 | 1.0 | 3.0 | 94.0 | $5 \times 10^8$ | 40 | 50 | ○ | X | 2H | ○ | ○ | ○ | X |
| Example D15 | 1.0 | 0.1 | 96.0 | $5 \times 10^{13}$ | 70 | 85 | ○ | ○ | 2H | ○ | ○ | X | X |

(E) Leveling Material: Compound which has a Siloxane Bond×Conductive Material: Metal Oxide Particle Hereinafter, Examples in which a compound which has a siloxane bond is used as a leveling material and a metal oxide particle is used as the conductive material, are described.

Hereinafter, Preparation Examples of the coating liquids for forming a localized layer E1 to E11 are described.

Preparation Example E1

(Coating Fluid for Forming Localized Layer E1)

With respect to 100 parts by weight of urethane acrylate (trade name: UA-306T, manufactured by KYOEISHA CHEMICAL Co., LTD.), a mixture of

| antimony-containing tin oxide (the average particle size of 50 nm/isopropyl alcohol dispersion liquid) (solid content) | 5 parts by weight |
|---|---|
| BYK-330 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer E1.

Preparation Example E2

(Coating Fluid for Forming Localized Layer E1)

With respect to 100 parts by weight of urethane acrylate (trade name: UA-306T, manufactured by KYOEISHA CHEMICAL Co., LTD.), a mixture of

| phosphorus-containing tin oxide (the average particle size of 50 nm/isopropyl alcohol dispersion liquid) (solid content) | 5 parts by weight |
|---|---|
| BYK-330 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer E1.

Preparation Example E3

(Coating fluid for forming localized layer E3)

With respect to 100 parts by weight of urethane acrylate (trade name: UA-306T, manufactured by KYOEISHA CHEMICAL Co., LTD.), a mixture of

| antimony-containing tin oxide (the average particle size of 50 nm/isopropyl alcohol dispersion liquid) (solid content) | 5 parts by weight |
|---|---|
| BYK-Silclean3700 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer E3.

Preparation Example E4

(Coating Fluid for Forming Localized Layer E4)
With respect to 100 parts by weight of urethane acrylate (trade name: UA-306T, manufactured by KYOEISHA CHEMICAL Co., LTD.), a mixture of

| | |
|---|---|
| antimony-containing tin oxide (the average particle size of 50 nm/isopropyl alcohol dispersion liquid) (solid content) | 0.01 part by weight |
| BYK-330 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer E4.

Preparation Example E5

(Coating Fluid for Forming Localized Layer E5)
With respect to 100 parts by weight of urethane acrylate (trade name: UA-306T, manufactured by KYOEISHA CHEMICAL Co., LTD.), a mixture of

| | |
|---|---|
| antimony-containing tin oxide (the average particle size of 50 nm/isopropyl alcohol dispersion liquid) (solid content) | 100 parts by weight |
| BYK-330 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer E5.

Preparation Example E6

(Coating Fluid for Forming Localized Layer E6)
With respect to 100 parts by weight of urethane acrylate (trade name: UA-306T, manufactured by KYOEISHA CHEMICAL Co., LTD.), a mixture of

| | |
|---|---|
| antimony-containing tin oxide (the average particle size of 1,000 nm/isopropyl alcohol dispersion liquid) (solid content) | 5 parts by weight |
| BYK-330 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer E6.

Preparation Example E7

(Coating Fluid for Forming Localized Layer E7)
With respect to 100 parts by weight of urethane acrylate (trade name: UA-306T, manufactured by KYOEISHA CHEMICAL Co., LTD.), a mixture of

| | |
|---|---|
| antimony-containing tin oxide (the average particle size of 50 nm/isopropyl alcohol dispersion liquid) (solid content) | 5 parts by weight |
| BYK-330 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of isopropyl alcohol, the solution was named as coating liquid for forming a localized layer E7.

Preparation Example E8

(Coating Fluid for Forming Localized Layer E8)
With respect to 100 parts by weight of urethane acrylate (trade name: UA-306T, manufactured by KYOEISHA CHEMICAL Co., LTD.), a mixture of

| | |
|---|---|
| antimony-containing tin oxide (the average particle size of 50 nm/isopropyl alcohol dispersion liquid) (solid content) | 5 parts by weight |
| BYK-350 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 20 wt % with the use of methyl ethyl ketone, the solution was named as coating liquid for forming a localized layer E8.

Preparation Example E9

(Coating Fluid for Forming Localized Layer E9)
With respect to 100 parts by weight of urethane acrylate (trade name: UA-306T, manufactured by KYOEISHA CHEMICAL Co., LTD.), a mixture of

| | |
|---|---|
| antimony-containing tin oxide (the average particle size of 50 nm/isopropyl alcohol dispersion liquid) (solid content) | 5 parts by weight |
| BYK-330 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 90 wt % with the use of methyl ethyl ketone, the solution was named as coating liquid for forming a localized layer E9.

Preparation Example E10

(Coating Fluid for Forming Localized Layer E10)
With respect to 100 parts by weight of urethane acrylate (trade name: UA-306T, manufactured by KYOEISHA CHEMICAL Co., LTD.), a mixture of

| | |
|---|---|
| antimony-containing tin oxide (the average particle size of 50 nm/isopropyl alcohol dispersion liquid) (solid content) | 5 parts by weight |

-continued

| | |
|---|---|
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer E10.

Preparation Example E11

(Coating Fluid for Forming Localized Layer E11)
With respect to 100 parts by weight of urethane acrylate (trade name: UA-306T, manufactured by KYOEISHA CHEMICAL Co., LTD.), a mixture of

| | |
|---|---|
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer E11.

Hereinafter, Preparation Examples of the coating liquid for forming a low refractive index layer E are described.

(Coating Fluid for Forming Low Refractive Index Layer E)
A mixture of

| | |
|---|---|
| dispersion liquid of porous silica fine particles (the average particle size of 50 nm/the solid content of 20 wt %/methyl isobutyl ketone dispersion liquid) (solid content) | 2.5 parts by weight |
| EO-modified dipentaerythritol hexaacrylate (trade name: DPEA-12, manufactured by NIPPO KAYAKU Co., Ltd.) | 2.5 parts by weight |
| photoinitiator (trade name: IRGACURE 184, manufactured by Ciba Japan K.K.) | 0.1 part by weight | was prepared, and then the mixture was adjusted so as to be a solution with the solid content of 5 wt % with the use of isopropyl alcohol, the solution was named as coating liquid for forming a low refractive index layer E.

Example E1

(Formation of Localized Layer)
Onto one surface of a triacetyl cellulose film (manufactured by FUJIFILM Corporation, the film thickness of 80 µm), the coating liquid for forming a localized layer E1 was applied. The applied surface was dried at 25° C. for 10 seconds in a drying oven as primary drying, continuously at 80° C. for 50 seconds in a drying oven as secondary drying, and then irradiated with ultraviolet light with the use of an ultraviolet irradiation apparatus (manufactured by Fusion UV Systems Japan KK., light source: H bulb) at an irradiation dose of 300 mJ/m$^2$, thereby to form a transparent localized layer with the dry film thickness of 5 µm.

(Formation of Low Refractive Index Layer)
Onto the localized layer formed above, the coating liquid for forming a low refractive index layer E was applied so that the film thickness after the drying became 100 nm. The applied surface was dried at the primary drying temperature of 25° C. for 25 seconds and then at the secondary drying temperature of 80° C. for 50 seconds, and then irradiated with ultraviolet light with the use of an ultraviolet irradiation apparatus (manufactured by Fusion UV Systems Japan KK., light source: H bulb) at an irradiation dose of 192 mJ/m$^2$ to cure the film, thereby to form a low refractive index layer, and the anti-reflection film of [Example E1] was prepared.

Example E2 to Example E9

In [Example E2] to [Example E9], with the use of the coating liquids for forming a localized layer E2 to E9 instead of the coating liquid for forming a localized layer E1, with the other production conditions being the same as those in [Example E1], the anti-reflection films of [Example E2] to [Example E9] were prepared.

Example E10 to Example E12

In [Example E10], with the use of the coating liquid for forming a localized layer E1, the localized layer was formed at the primary drying temperature of 50° C. and at the secondary drying temperature of 60° C., and with the other production conditions being the same as those in [Example E1], the anti-reflection film of [Example E10] was prepared.

In [Example E11 ], with the use of the coating liquid for forming a localized layer E1, the localized layer was formed at both the primary drying temperature and the secondary drying temperature of 25° C., and with the other production conditions being the same as those in [Example E1], the anti-reflection film of [Example E11] was prepared.

In [Example E12], with the use of the coating liquid for forming a localized layer E1, the localized layer was formed at both the primary drying temperature and the secondary drying temperature of 80° C., and with the other production conditions being the same as those in [Example E1], the anti-reflection film of [Example E12] was prepared.

Example E13 and Example E14

In [Example E13] and [Example E14], with the use of the coating liquids for forming a localized layer E13 and E14 instead of the coating liquid for forming a localized layer E1, with the other production conditions being the same as those in [Example E1], the anti-reflection films of [Example E13] and [Example E14] were prepared.

The production conditions in [Example E1] to [Example E14] are described collectively in Table 9.

TABLE 9

| | Coating Liquid for Forming | Metal Oxide Particle Name of Material | Metal Oxide Particle Average Particle Size (nm) | Metal Oxide Particle Amount | Leveling Material Name of Material | Solvent Name of Material | Solid Content Adjustment | Primary Drying Temperature | Secondary Drying Temperature |
|---|---|---|---|---|---|---|---|---|---|
| Example E1 | Localized Layer-Forming Coating Liquid E1 | ATO | 50 | 5 Part by Weight | BYK-330 | Methyl Ethyl Ketone | 50% | 25° C. | 80° C. |
| Example E2 | Localized Layer-Forming Coating Liquid E2 | PTO | 50 | 5 Part by Weight | BYK-330 | Methyl Ethyl Ketone | 50% | 25° C. | 80° C. |
| Example E3 | Localized Layer-Forming Coating Liquid E3 | ATO | 50 | 5 Part by Weight | BYK-Silclean 3700 | Methyl Ethyl Ketone | 50% | 25° C. | 80° C. |
| Example E4 | Localized Layer-Forming Coating Liquid E4 | ATO | 50 | 0.01 Part by Weight | BYK-330 | Methyl Ethyl Ketone | 50% | 25° C. | 80° C. |
| Example E5 | Localized Layer-Forming Coating Liquid E5 | ATO | 50 | 100 Part by Weight | BYK-330 | Methyl Ethyl Ketone | 50% | 25° C. | 80° C. |
| Example E6 | Localized Layer-Forming Coating Liquid E6 | ATO | 1000 | 5 Part by Weight | BYK-330 | Methyl Ethyl Ketone | 50% | 25° C. | 80° C. |
| Example E7 | Localized Layer-Forming Coating Liquid E7 | ATO | 50 | 5 Part by Weight | BYK-330 | Isopropyl Alcohol | 50% | 25° C. | 80° C. |
| Example E8 | Localized Layer-Forming Coating Liquid E8 | ATO | 50 | 5 Part by Weight | BYK-330 | Methyl Ethyl Ketone | 20% | 25° C. | 80° C. |
| Example E9 | Localized Layer-Forming Coating Liquid E9 | ATO | 50 | 5 Part by Weight | BYK-330 | Methyl Ethyl Ketone | 90% | 25° C. | 80° C. |
| Example E10 | Localized Layer-Forming Coating Liquid E1 | ATO | 50 | 5 Part by Weight | BYK-330 | Methyl Ethyl Ketone | 50% | 50° C. | 60° C. |
| Example E11 | Localized Layer-Forming Coating Liquid E1 | ATO | 50 | 5 Part by Weight | BYK-330 | Methyl Ethyl Ketone | 50% | 25° C. | |
| Example E12 | Localized Layer-Forming Coating Liquid E1 | ATO | 50 | 5 Part by Weight | BYK-330 | Methyl Ethyl Ketone | 50% | 80° C. | |
| Example E13 | Localized Layer-Forming Coating Liquid E10 | ATO | 50 | 5 Part by Weight | — | Methyl Ethyl Ketone | 50% | 25° C. | 80° C. |
| Example E14 | Localized Layer-Forming Coating Liquid E11 | — | — | — | — | Methyl Ethyl Ketone | 50% | 25° C. | 80° C. |

As for the obtained anti-reflection films of [Example E1] to [Example E14], evaluations were performed as described above, and the state of formation of each layer in the localized layer was confirmed. The evaluation results and the like are described collectively in Table 10.

(F) Leveling Material: Compound which has a Siloxane Bond×Conductive Material: Quaternary Ammonium Salt Hereinafter, Examples in which a compound which has a siloxane bond is used as a leveling material and a conductive polymer is used as a conductive material, are described.

TABLE 10

| | Parallel Luminous Reflectance (%) | Haze (%) | Parallel Light Transmittance (%) | Surface Resistivity (Ω/□) | Contact Angle (°) Localized Layer Surface | Contact Angle (°) Low-refractive Index Surface | Color Irregularity and Interference Fringes | Excoriation Resistance (SW) | Pencil Hardness | State of Localized Layer Formation Intermediate Layer | Hard Coat Layer | Antistatic Layer | Leveling Layer |
|---|---|---|---|---|---|---|---|---|---|---|---|---|---|
| Example E1 | 1.0 | 0.1 | 95.0 | $1 \times 10^9$ | 75 | 85 | ○ | ○ | 2H | ○ | ○ | ○ | ○ |
| Example E2 | 1.0 | 0.1 | 95.0 | $1 \times 10^9$ | 75 | 85 | ○ | ○ | 2H | ○ | ○ | ○ | ○ |
| Example E3 | 1.0 | 0.1 | 95.0 | $1 \times 10^9$ | 75 | 85 | ○ | ○ | 2H | ○ | ○ | ○ | ○ |
| Example E4 | 1.0 | 0.1 | 95.0 | $1 \times 10^{13}$ | 75 | 85 | ○ | ○ | 2H | ○ | ○ | X | ○ |
| Example E5 | 1.0 | 5.0 | 95.5 | $2 \times 10^8$ | 40 | 60 | ○ | X | 2H | ○ | ○ | ○ | X |
| Example E6 | 1.0 | 3.0 | 93.5 | $1 \times 10^9$ | 50 | 50 | ○ | X | 2H | ○ | ○ | ○ | X |
| Example E7 | 1.0 | 0.1 | 95.0 | $1 \times 10^8$ | 75 | 85 | X | ○ | 2H | X | ○ | ○ | ○ |
| Example E8 | 1.0 | 3.0 | 92.0 | $1 \times 10^8$ | 40 | 60 | ○ | X | B | ○ | X | ○ | X |
| Example E9 | 1.0 | 3.0 | 92.0 | $5 \times 10^{13}$ | 75 | 85 | X | ○ | 2H | X | ○ | X | X |
| Example E10 | 1.0 | 2.0 | 93.0 | $1 \times 10^{13}$ | 60 | 85 | ○ | X | 2H | ○ | ○ | X | X |
| Example E11 | 1.0 | 0.1 | 95.0 | $1 \times 10^9$ | 40 | 50 | ○ | X | B | ○ | X | ○ | X |
| Example E12 | 1.0 | 0.1 | 95.0 | $5 \times 10^{13}$ | 60 | 85 | ○ | ○ | 2H | ○ | ○ | X | X |
| Example E13 | 1.0 | 5.0 | 93.0 | $5 \times 10^8$ | 40 | 50 | ○ | X | 2H | ○ | ○ | ○ | X |
| Example E14 | 1.0 | 0.1 | 96.0 | $5 \times 10^{13}$ | 70 | 85 | ○ | ○ | 2H | ○ | ○ | X | X |

Hereinafter, Preparation Examples of the coating liquids for forming a localized layer F1 to F10 are described.

Preparation Example F1

(Coating Fluid for Forming Localized Layer F1)

With respect to 100 parts by weight of urethane acrylate (trade name: UA-306T, manufactured by KYOEISHA CHEMICAL Co., LTD.), a mixture of

| | |
|---|---|
| polythiophene (the average particle size of 100 nm/isopropyl alcohol dispersion liquid) (solid content) | 5 parts by weight |
| BYK-330 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer F1.

Preparation Example F2

(Coating Fluid for Forming Localized Layer F2)

With respect to 100 parts by weight of urethane acrylate (trade name: UA-306T, manufactured by KYOEISHA CHEMICAL Co., LTD.), a mixture of

| | |
|---|---|
| polyaniline (the average particle size of 75 nm/isopropyl alcohol dispersion liquid) (solid content) | 5 parts by weight |
| BYK-330 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer F2.

Preparation Example F3

(Coating Fluid for Forming Localized Layer F3)

With respect to 100 parts by weight of urethane acrylate (trade name: UA-306T, manufactured by KYOEISHA CHEMICAL Co., LTD.), a mixture of

| | |
|---|---|
| polythiophene (the average particle size of 300 nm/isopropyl alcohol dispersion liquid) (solid content) | 5 parts by weight |
| BYK-330 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer F3.

Preparation Example F4

(Coating Fluid for Forming Localized Layer F4)

With respect to 100 parts by weight of urethane acrylate (trade name: UA-306T, manufactured by KYOEISHA CHEMICAL Co., LTD.), a mixture of

| | |
|---|---|
| polythiophene (the average particle size of 100 nm/isopropyl alcohol dispersion liquid) (solid content) | 5 parts by weight |
| BYK-Silclean3700 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer F4.

Preparation Example F5

(Coating Fluid for Forming Localized Layer F5)

With respect to 100 parts by weight of urethane acrylate (trade name: UA-306T, manufactured by KYOEISHA CHEMICAL Co., LTD.), a mixture of

| | |
|---|---|
| polythiophene (the average particle size of 100 nm/isopropyl alcohol dispersion liquid) (solid content) | 0.01 part by weight |
| BYK-330 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer F5.

Preparation Example F6

(Coating Fluid for Forming Localized Layer F6)

With respect to 100 parts by weight of urethane acrylate (trade name: UA-306T, manufactured by KYOEISHA CHEMICAL Co., LTD.), a mixture of

| | |
|---|---|
| polythiophene (the average particle size of 100 nm/isopropyl alcohol dispersion liquid) (solid content) | 5 parts by weight |
| BYK-330 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of isopropyl alcohol, the solution was named as coating liquid for forming a localized layer F6.

Preparation Example F7

(Coating Fluid for Forming Localized Layer F7)

With respect to 100 parts by weight of urethane acrylate (trade name: UA-306T, manufactured by KYOEISHA CHEMICAL Co., LTD.), a mixture of

| | |
|---|---|
| polythiophene (the average particle size of 100 nm/isopropyl alcohol dispersion liquid) (solid content) | 5 parts by weight |
| BYK-330 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 20 wt % with the use of methyl ethyl ketone, the solution was named as coating liquid for forming a localized layer F7.

Preparation Example F8

(Coating Fluid for Forming Localized Layer F8)

With respect to 100 parts by weight of urethane acrylate (trade name: UA-306T, manufactured by KYOEISHA CHEMICAL Co., LTD.), a mixture of

| | |
|---|---|
| polythiophene (the average particle size of 100 nm/isopropyl alcohol dispersion liquid) (solid content) | 5 parts by weight |
| BYK-330 | 0.1 part by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 90 wt % with the use of methyl ethyl ketone, the solution was named as coating liquid for forming a localized layer F8.

Preparation Example F9

(Coating Fluid for Forming Localized Layer F9)

With respect to 100 parts by weight of urethane acrylate (trade name: UA-306T, manufactured by KYOEISHA CHEMICAL Co., LTD.), a mixture of

| | |
|---|---|
| polythiophene (the average particle size of 100 nm/isopropyl alcohol dispersion liquid) (solid content) | 5 parts by weight |
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer F9.

Preparation Example F10

(Coating Fluid for Forming Localized Layer F10)

With respect to 100 parts by weight of urethane acrylate (trade name: UA-306T, manufactured by KYOEISHA CHEMICAL Co., LTD.), a mixture of

| | |
|---|---|
| dipentaerythritol triacrylate | 50 parts by weight |
| pentaerythritol tetraacrylate | 50 parts by weight |
| photoinitiator (trade name: IRGACURE 184, manufactured by Ciba Japan K.K.) | 10 parts by weight | was prepared, and then the mixture was adjusted so as to be a solution with the solid content of 50 wt % with the use of methyl ethyl ketone, the solution was named as coating liquid for forming a localized layer F10.

Hereinafter, Preparation Examples of the coating liquid for forming a low refractive index layer F are described.

(Coating Fluid for Forming Low Refractive Index Layer F)

A mixture of

| | |
|---|---|
| dispersion liquid of porous silica fine particles (the average particle size of 50 nm/the solid content of 20 wt %/methyl isobutyl ketone dispersion liquid) (solid content) | 2.5 parts by weight |
| EO-modified dipentaerythritol hexaacrylate (trade name: DPEA-12, manufactured by NIPPO KAYAKU Co., Ltd.) | 2.5 parts by weight |
| photoinitiator (trade name: IRGACURE 184, manufactured by Ciba Japan K.K.) | 0.1 part by weight | was prepared, and then the mixture was adjusted so as to be a solution with the solid content of 5 wt % with the use of isopropyl alcohol, the solution was named as coating liquid for forming a low refractive index layer F.

Example F1

(Formation of Localized Layer)

Onto one surface of a triacetyl cellulose film (manufactured by FUJIFILM Corporation, the film thickness of 80 µm), the coating liquid for forming a localized layer F1 was applied. The applied surface was dried at 25° C. for 10 seconds in a drying oven as primary drying, continuously at 80° C. for 50 seconds in a drying oven as secondary drying, and then irradiated with ultraviolet light with the use of an ultraviolet irradiation apparatus (manufactured by Fusion UV Systems Japan KK., light source: H bulb) at an irradiation dose of 300 mJ/m$^2$, thereby to form a transparent localized layer with the dry film thickness of 5 µm.

(Formation of Low Refractive Index Layer)

Onto the localized layer formed above, the coating liquid for forming a low refractive index layer F was applied so that the film thickness after the drying became 100 nm. The applied surface was dried at the primary drying temperature of 25° C. for 25 seconds and then at the primary drying temperature of 80° C. for 50 seconds, and then irradiated with ultraviolet light with the use of an ultraviolet irradiation apparatus (manufactured by Fusion UV Systems Japan KK., light source: H bulb) at an irradiation dose of 192 mJ/m$^2$ to cure the film, thereby to form a low refractive index layer, and the anti-reflection film of [Example F1] was prepared.

Example F2 to Example F8

In [Example F2] to [Example F8], with the use of the coating liquids for forming a localized layer F2 to F8 instead of the coating liquid for forming a localized layer F1, with the other production conditions being the same as those in [Example F1], the anti-reflection films of [Example F2] to [Example F8] were prepared.

Example F9 to Example F11

In [Example F9], with the use of the coating liquid for forming a localized layer F1, the localized layer was formed at the primary drying temperature of 50° C. and at the secondary drying temperature of 60° C., and with the other production conditions being the same as those in [Example F1], the anti-reflection film of [Example F9] was prepared.

In [Example F10], with the use of the coating liquid for forming a localized layer F1, the localized layer was formed at both the primary drying temperature and the secondary drying temperature of 25° C., and with the other production conditions being the same as those in [Example F1], the anti-reflection film of [Example F10] was prepared.

In [Example F11], with the use of the coating liquid for forming a localized layer F1, the localized layer was formed at both the primary drying temperature and the secondary drying temperature of 80° C., and with the other production conditions being the same as those in [Example F1], the anti-reflection film of [Example F11] was prepared.

Example F12 and Example F13

In [Example F12] and [Example F13], with the use of the coating liquids for forming a localized layer F9 and F10 instead of the coating liquid for forming a localized layer F1, with the other production conditions being the same as those in [Example F1], the anti-reflection films of [Example F12] and [Example F13] were prepared.

The production conditions in [Example F1] to [Example F13] are described collectively in Table 11.

TABLE 11

| | Production Condition | | | | | | | |
|---|---|---|---|---|---|---|---|---|
| | | Conductive Polymer | | | | Solvent | Drying Temperature | |
| | Coating Liquid for Forming | Name of Material | Average Particle Size (nm) | Amount | Leveling Material Name of Material | Name of Material | Solid Content Adjustment | Primary Drying Temperature | Secondary Drying Temperature |
| Example F1 | Localized Layer-Forming Coating Liquid F1 | Polythiophene | 100 | 5 Part by Weight | BYK-330 | Methyl Ethyl Ketone | 50% | 25° C. | 80° C. |
| Example F2 | Localized Layer-Forming Coating Liquid F2 | Polyaniline | 75 | 5 Part by Weight | BYK-330 | Methyl Ethyl Ketone | 50% | 25° C. | 80° C. |
| Example F3 | Localized Layer-Forming Coating Liquid F3 | Polythiophene | 300 | 5 Part by Weight | BYK-330 | Methyl Ethyl Ketone | 50% | 25° C. | 80° C. |
| Example F4 | Localized Layer-Forming Coating Liquid F4 | Polythiophene | 100 | 5 Part by Weight | BYK-Silclean 3700 | Methyl Ethyl Ketone | 50% | 25° C. | 80° C. |
| Example F5 | Localized Layer-Forming Coating Liquid F5 | Polythiophene | 100 | 0.01 Part by Weight | BYK-330 | Methyl Ethyl Ketone | 50% | 25° C. | 80° C. |
| Example F6 | Localized Layer-Forming Coating Liquid F6 | Polythiophene | 100 | 5 Part by Weight | BYK-330 | Isopropyl Alcohol | 50% | 25° C. | 80° C. |
| Example F7 | Localized Layer-Forming Coating Liquid F7 | Polythiophene | 100 | 5 Part by Weight | BYK-330 | Methyl Ethyl Ketone | 20% | 25° C. | 80° C. |
| Example F8 | Localized Layer-Forming Coating Liquid F8 | Polythiophene | 100 | 5 Part by Weight | BYK-330 | Methyl Ethyl Ketone | 90% | 25° C. | 80° C. |
| Example F9 | Localized Layer-Forming Coating Liquid F1 | Polythiophene | 100 | 5 Part by Weight | BYK-330 | Methyl Ethyl Ketone | 50% | 50° C. | 60° C. |
| Example F10 | Localized Layer-Forming Coating Liquid F1 | Polythiophene | 100 | 5 Part by Weight | BYK-330 | Methyl Ethyl Ketone | 50% | 25° C. | |
| Example F11 | Localized Layer-Forming Coating Liquid F1 | Polythiophene | 100 | 5 Part by Weight | BYK-330 | Methyl Ethyl Ketone | 50% | 80° C. | |
| Example F12 | Localized Layer-Forming Coating Liquid F9 | Polythiophene | 100 | 5 Part by Weight | — | Methyl Ethyl Ketone | 50% | 25° C. | 80° C. |
| Example F13 | Localized Layer-Forming Coating Liquid F10 | — | — | — | — | Methyl Ethyl Ketone | 50% | 25° C. | 80° C. |

As for the obtained anti-reflection films of [Example F1] to [Example F13], evaluations were performed as described above, and the state of formation of each layer in the localized layer was confirmed. The evaluation results and the like are described collectively in Table 12.

TABLE 12

| | Evaluation Item | | | | | | | | | | | | |
|---|---|---|---|---|---|---|---|---|---|---|---|---|---|
| | | | | | Contact Angle (°) | | Color | | | | State of Localized Layer | | |
| | | | Parallel Light Transmittance (%) | Surface Resistivity ($\Omega/\square$) | Localized Layer Surface | Low-refractive Index Surface | Irregularity and Interference Fringes | Excoriation Resistance (SW) | Pencil Hardness | Formation | | | |
| | Luminous Reflectance (%) | Haze (%) | | | | | | | | Intermediate Layer | Hard Coat Layer | Antistatic Layer | Leveling Layer |
| Example F1 | 1.0 | 0.1 | 95.0 | $1 \times 10^9$ | 75 | 85 | ○ | ○ | 2H | ○ | ○ | ○ | ○ |
| Example F2 | 1.0 | 0.1 | 95.0 | $1 \times 10^9$ | 75 | 85 | ○ | ○ | 2H | ○ | ○ | ○ | ○ |
| Example F3 | 1.0 | 0.1 | 95.0 | $1 \times 10^9$ | 75 | 85 | ○ | ○ | 2H | ○ | ○ | ○ | ○ |
| Example F4 | 1.0 | 0.1 | 95.0 | $1 \times 10^9$ | 75 | 85 | ○ | ○ | 2H | ○ | ○ | ○ | ○ |

TABLE 12-continued

| | Evaluation Item | | | | | | | | | | | | |
|---|---|---|---|---|---|---|---|---|---|---|---|---|---|
| | Parallel | | | Contact Angle (°) | | Color | | | | State of Localized Layer | | | |
| | Luminous | | Light | Surface | Local- | Low- | Irregularity | Excori- | | Formation | | | |
| | Reflec-tance (%) | Haze (%) | Transmit-tance (%) | Resis-tivity (Ω/□) | ized Layer Surface | refractive Index Surface | and Interference Fringes | ation Resistance (SW) | Pencil Hard-ness | Inter-mediate Layer | Hard Coat Layer | Anti-static Layer | Level-ing Layer |
| Example F5 | 1.0 | 0.1 | 95.5 | 1 × 10¹³ | 75 | 85 | ○ | ○ | 2H | ○ | ○ | X | ○ |
| Example F6 | 1.0 | 0.1 | 95.0 | 1 × 10⁸ | 75 | 85 | X | ○ | 2H | X | ○ | ○ | ○ |
| Example F7 | 1.0 | 3.0 | 93.5 | 1 × 10⁸ | 40 | 60 | ○ | X | B | ○ | X | ○ | X |
| Example F8 | 1.0 | 0.7 | 95.0 | 5 × 10¹³ | 75 | 85 | X | ○ | 2H | X | ○ | X | X |
| Example F9 | 1.0 | 2.0 | 92.0 | 1 × 10¹³ | 60 | 85 | ○ | X | 2H | ○ | ○ | X | X |
| Example F10 | 1.0 | 0.1 | 95.0 | 1 × 10⁹ | 40 | 50 | ○ | X | B | ○ | X | ○ | X |
| Example F11 | 1.0 | 0.1 | 95.0 | 5 × 10¹³ | 60 | 85 | ○ | ○ | 2H | ○ | ○ | X | X |
| Example F12 | 1.0 | 3.0 | 92.0 | 5 × 10⁸ | 40 | 50 | ○ | X | 2H | ○ | ○ | ○ | X |
| Example F13 | 1.0 | 0.1 | 96.0 | 5 × 10¹³ | 70 | 85 | ○ | ○ | 2H | ○ | ○ | X | X |

As the results of Examples, by preparing with the preparation of an anti-reflection film in which a localized layer is constituted with an intermediate layer, a hard coat layer, an antistatic layer and a leveling layer, an anti-reflection film having low production costs, excellent optical property, high excoriation resistance, and antistatic performance could be provided.

What is claimed is:
1. An anti-reflection film comprising:
a transparent substrate;
a localized layer containing a binder matrix component; and
a low refractive index layer; wherein:
said localized layer and said low refractive index layer being stacked on said transparent substrate in this order;
an intermediate layer, a hard coat layer, an antistatic layer and a leveling layer being stacked in this order in said localized layer on said transparent substrate
said intermediate layer containing the binder matrix component;
said hard coat layer containing the binder matrix component;
said antistatic layer containing a conductive material and the binder matrix component; and
said leveling layer containing a leveling material and the binder matrix component; and
said leveling material containing a fluorocompound or a compound which has a siloxane bond, and wherein the content of the binder matrix component in each layer is different from that of the other layer.

2. The anti-reflection film according to claim 1, wherein said anti-reflection film has
a parallel light transmittance of 93% or more,
a haze of 1.0% or less,
a surface resistivity in the range of $1\times10^5$-$1\times10^{12}$Ω/□ on said low refractive index layer, and
a pure water contact angle in the range of 80° -130° on a surface of said low refractive index layer.

3. The anti-reflection film according to claim 1, wherein said leveling material includes a fluorocompound selected from the group consisting of a compound containing a perfluoroalkyl group; and
a compound containing a fluorinated alkenyl group.

4. The anti-reflection film according to claim 1, wherein said conductive material contained in said antistatic layer is selected from the group consisting of a quaternary ammonium salt material;
a metal oxide particle; and
a conductive polymer.

5. The anti-reflection film according to claim 1, wherein said conductive material contained in said antistatic layer includes a quaternary ammonium salt material;
said leveling material contained in said leveling layer includes a fluorocompound
a molecular weight of said quaternary ammonium salt material (Q) is 1,000 - 100,000 grams/mol; and
a molecular weight of said fluorocompound (A) is 500 - 100,000 grams/mol.

6. The anti-reflection film according to claim 1, wherein said conductive material contained in said antistatic layer includes metal oxide particle;
said leveling material contained in said leveling layer includes a fluorocompound;
an average particle size of said metal oxide particles is 1 - 500 nm; and
a molecular weight of said fluorocompound (A) is 500 - 100,000 grams/mol.

7. The anti-reflection film according to claim 1, wherein said conductive material contained in said antistatic layer includes a conductive polymer;
said leveling material contained in said leveling layer includes a fluorocompound;
an average particle size of said conductive polymer is 1-1,000 nm; and
a molecular weight of said fluorocompound (A) is 500-100,000 grams/mol.

8. The anti-reflection film according to claim 1, wherein said conductive material contained in said antistatic layer includes a quaternary ammonium salt material,
said leveling material contained in said leveling layer includes a compound which has a siloxane bond,
a molecular weight of said quaternary ammonium salt material (Q) is 1,000-100,000grams/mol, and
a molecular weight of said compound which has a siloxane bond (B) is 500-100,000 grams/mol.

9. The anti-reflection film according to claim 1, wherein said conductive material contained in said antistatic layer includes metal oxide particles, said leveling material contained in said leveling layer includes a compound which has a siloxane bond,
an average particle size of said metal oxide particles is 1-500 nm, and a molecular weight of said compound which has a siloxane bond (B) is 500-100,000 grams/mol.

10. The anti-reflection film according to claim 1, wherein
said conductive material contained in said antistatic layer includes a conductive polymer,
said leveling material contained in said leveling layer includes a compound which has a siloxane bond,
an average particle size of said conductive polymer is 1 - 1,000 nm, and
a molecular weight of said compound which has a siloxane bond (B) is 500 - 100,000 grams/mol.

* * * * *